United States Patent
Soga

(10) Patent No.: US 6,811,229 B2
(45) Date of Patent: Nov. 2, 2004

(54) VEHICULAR BRAKING CONTROL APPARATUS AND BRAKING CONTROL METHOD THEREOF

(75) Inventor: Masayuki Soga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 18 days.

(21) Appl. No.: 10/265,398

(22) Filed: Oct. 7, 2002

(65) Prior Publication Data

US 2003/0080614 A1 May 1, 2003

(30) Foreign Application Priority Data

Oct. 25, 2001 (JP) ........................................ 2001-327384

(51) Int. Cl.⁷ .............................................. B60T 8/64
(52) U.S. Cl. ............................ 303/152; 303/3; 188/156
(58) Field of Search ................................. 303/152, 150, 303/148, 3; 188/156; 180/65.1, 61.2, 65.8; 701/70, 73, 80

(56) References Cited

U.S. PATENT DOCUMENTS

| | | | | |
|---|---|---|---|---|
| 5,322,352 A | * | 6/1994 | Ohno et al. ........................ 303/3 |
| 5,378,053 A | * | 1/1995 | Patient et al. ..................... 303/3 |
| 5,511,859 A | * | 4/1996 | Kade et al. ........................ 303/3 |
| 5,839,800 A | * | 11/1998 | Koga et al. .................... 303/152 |
| 6,454,364 B1 | * | 9/2002 | Niwa et al. ................... 303/152 |
| 6,457,784 B1 | * | 10/2002 | Bohm et al. .................. 303/155 |
| 6,598,945 B2 | * | 7/2003 | Shimada et al. ............. 303/152 |

FOREIGN PATENT DOCUMENTS

JP       A 2000-50409       2/2000

* cited by examiner

Primary Examiner—Matthew C. Graham
Assistant Examiner—Mariano Sy
(74) Attorney, Agent, or Firm—Oliff & Berridge, PLC

(57) ABSTRACT

A vehicular braking control apparatus and method controls frictional braking performed by a frictional braking device, controls regenerative braking performed by a regenerative braking device, and controls shifting between a cooperative braking mode, realized by the frictional braking and the regenerative braking, and a single braking mode, realized by only the frictional braking. A correction coefficient for one of a frictional braking control amount and a regenerative braking control amount is calculated on the basis of an actual degree of vehicle deceleration and a reference degree of vehicle deceleration based on an amount of braking operation performed by a driver during braking in the single braking mode. The control amount is corrected based on the correction coefficient.

14 Claims, 15 Drawing Sheets

VEHICULAR BRAKING CONTROL APPARATUS AND BRAKING CONTROL METHOD THEREOF

INCORPORATION BY REFERENCE

The disclosure of Japanese Patent Application No. 2001-327384 filed on Oct. 25, 2001, including the specification, drawings, and abstract is incorporated herein by reference in its entirety.

BACKGROUND OF THE INVENTION

1. Field of Invention

The invention relates to a vehicular braking control apparatus and, more particularly, to a braking control apparatus for performing frictional braking by means of a frictional braking device and regenerative braking by means of a regenerative braking device. The invention also relates to a braking control method of the braking control apparatus.

2. Description of Related Art

Japanese Patent Application Laid-Open No. 2000-50409 discloses a braking force control apparatus that has a frictional braking device and a regenerative braking device that usually performs braking in a cooperative braking mode by frictional braking and regenerative braking. The braking force control apparatus discloses shifting from the cooperative braking mode to a single braking mode by frictional braking in case of necessity, and that returns from the single braking mode to the cooperative braking mode is known.

According to such a braking control apparatus, a part of the kinetic energy of the vehicle normally lost during braking is usually recovered as electric energy by regenerative braking. The effect of regenerative braking can be reliably eliminated if regenerative braking creates an obstacle to performing other controls of the vehicle, such as an antiskid control.

In general, during a braking control in the cooperative braking mode, a target braking amount for the entire vehicle, such as a braking requirement made by a driver, is distributed into a target frictional braking amount and a target regenerative braking amount. The frictional braking device and the regenerative braking device are controlled such that each of the frictional braking amount and the regenerative braking amount becomes equal to a corresponding one of target braking amounts.

During a shift from the cooperative braking mode to the single braking mode, when the sum of the target frictional braking amount and the target regenerative braking amount is equal to the target braking amount for the entire vehicle is maintained, the target regenerative braking amount and the target frictional braking amount are gradually reduced and increased respectively. The target frictional braking amount is finally set equal to the target braking amount for the entire vehicle. Similarly, if the single braking mode realized by frictional braking, is returned to the cooperative braking mode, when the sum of the target frictional braking amount and the target regenerative braking amount is equal to the target braking amount for the entire vehicle is maintained, the target regenerative braking amount and the target frictional braking amount are gradually increased and reduced respectively until the target regenerative braking amount reaches a maximum possible value.

However, the frictional braking device performs braking through a frictional force that is generated by pressing a frictional member such as a brake pad against a rotating body such as a brake rotor rotating together with wheels. Hence, if a friction characteristic value of the rotating body or the frictional member, such as a friction coefficient of the rotating body or the frictional member, is different from its designed value, the actual frictional braking amount does not become precisely equal to a target braking control amount no matter how precisely the pressing force applied to the rotating body by the frictional member is controlled.

An error in the actual frictional braking amount for the entire vehicle resulting from a deviation in the friction characteristics of the rotating body or the frictional member is small in a situation in which braking is performed in the cooperative braking mode. However, such an error is remarkable during a shift between the cooperative braking mode and the single braking mode realized by frictional braking. Hence, if there is a great deviation in the friction characteristics, the braking amount for the entire vehicle abruptly changes during a shift between the cooperative braking mode and the single braking mode. As a result, the vehicle deceleration abruptly fluctuates, which may cause a sense of incongruity to a passenger in the vehicle.

For example, if it is assumed that the target braking amount for the entire vehicle in the cooperative braking mode is 10, that the ratio between the target frictional braking amount and the target regenerative braking amount is 1:9, and that the actual deviation in the frictional braking amount resulting from a deviation in the friction characteristics of the frictional member is 10%, the actual error in the frictional braking amount for the entire vehicle in the cooperative braking mode is 0.1'0.1=0.01, that is, 1%. On the other hand, the actual error in the frictional braking amount for the entire vehicle in the single braking mode is 1'0.1=0.1, that is, no less than 10%.

As described above, in the braking control apparatus of the related art wherein braking is usually performed in the cooperative braking mode realized by frictional braking and regenerative braking and wherein a shift between the cooperative braking mode and the single braking mode realized by frictional braking is made in case of necessity, the braking amount for the entire vehicle abruptly changes during the shift. As a result, the vehicle deceleration abruptly fluctuates, which leads to a problem of a sense of incongruity being caused to a passenger in the vehicle.

SUMMARY OF THE INVENTION

The invention has been made in view of the problem as mentioned above. It is an object of the invention to prevent vehicle deceleration from abruptly fluctuating during a shift between a cooperative braking mode and a single braking mode regardless of fluctuations in friction characteristics of a frictional member of a frictional braking device. It is a further object of the invention to prevent such vehicle deceleration by correcting one of a frictional braking control amount and a regenerative braking control amount on the basis of a relationship between a reference degree of vehicle deceleration and an actual degree of vehicle deceleration.

Thus, in various exemplary embodiments, the invention provides a vehicular braking control apparatus comprising a mode controller, a calculator, and a corrector. The mode controller controls frictional braking by a frictional braking device and controls regenerative braking by a regenerative braking device and controls shifting between a cooperative braking mode, realized by frictional braking and regenerative braking, and a single braking mode, realized by frictional braking, in case of necessity. The calculator calculates a correction coefficient for one of a frictional braking control amount and a regenerative braking control amount on the basis of an actual degree of vehicle deceleration and a reference degree of vehicle deceleration based on an amount of braking operation performed by a driver during braking in the single braking mode. The corrector corrects the control amount based on the correction coefficient.

According to a further aspect of the invention, a braking control method is provided for a vehicular braking control apparatus that performs frictional braking by a frictional braking device and regenerative braking by a regenerative braking device. Control is performed by shifting between a cooperative braking mode, realized by frictional braking and regenerative braking, and a single braking mode, realized by frictional braking, in case of necessity. The braking control method comprises the steps of calculating a correction coefficient for one of a frictional braking control amount and a regenerative braking control amount on the basis of an actual degree of vehicle deceleration and a reference degree of vehicle deceleration based on an amount of braking operation performed by a driver during braking in the single braking mode, and correcting the control amount based on the correction coefficient.

According to various exemplary embodiments of the vehicular braking control apparatus and the braking control method of the present invention, the correction coefficient for the frictional braking control amount or the regenerative braking control amount is calculated on the basis of the actual degree of vehicle deceleration and the reference degree of vehicle deceleration based on the amount of braking operation performed by the driver during braking in the single braking mode, and the frictional braking control amount or the regenerative braking control amount is corrected based on the correction coefficient. Therefore, even if the friction characteristics of the frictional member deviate from predetermined characteristics, the effect of the deviation in the friction characteristics of the frictional member can be reduced by correcting the frictional braking control amount or the regenerative braking control amount. Hence, the braking force for the entire vehicle can be reliably prevented from abruptly changing during a shift between the cooperative braking mode and the single braking mode. Also, a passenger in the vehicle can be reliably prevented from feeling a shock due to abrupt fluctuations in vehicle deceleration resulting from such abrupt changes in the braking force for the entire vehicle.

BRIEF DESCRIPTION OF THE DRAWINGS

The objects, features, advantages, technical and industrial significance of this invention will be better understood by reading the following detailed description of exemplary embodiments of the invention, when considered in connection with the accompanying drawings, in which.

DETAILED DESCRIPTION OF PREFERRED EMBODIMENTS

In the following description and the accompanying drawings, the invention will be described in more detail in terms of exemplary embodiments.

Figure 1:
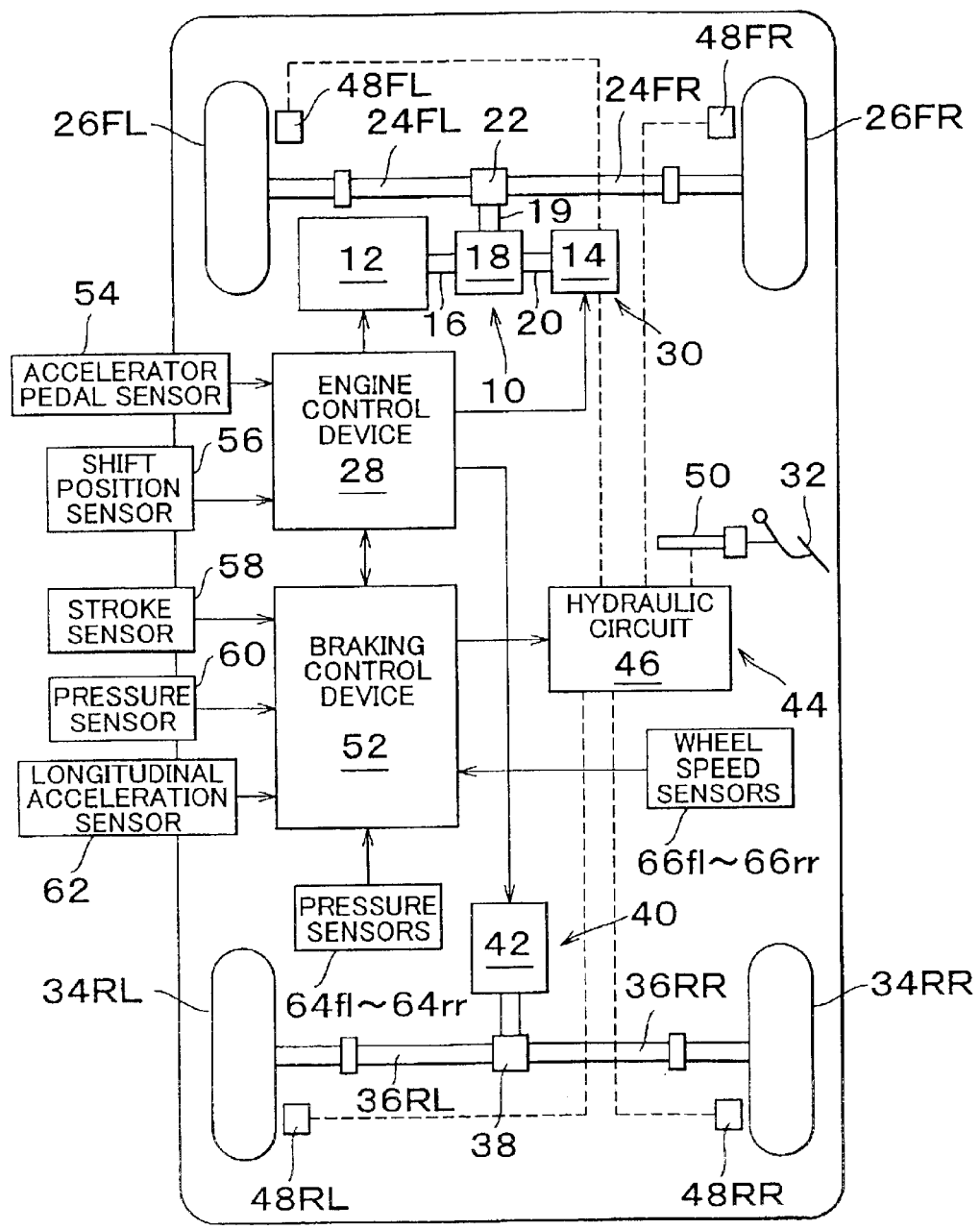
FIG. 1 is a schematic structural view of a braking control apparatus according to a first exemplary embodiment of the invention which is applied to a front-drive vehicle that has a regenerative braking device and a frictional braking device for front wheels and a regenerative braking device and a frictional braking device for rear wheels and that is equipped with a hybrid engine.

FIG. 1 is a schematic structural view of a braking control apparatus according to a first exemplary embodiment of the invention which is applied to a front-drive vehicle that has a regenerative braking device and a frictional braking device for front wheels and a regenerative braking device and a frictional braking device for rear wheels and that is equipped with a hybrid engine.

A hybrid engine 10 for driving front wheels is shown in FIG. 1. The hybrid engine 10 includes a gasoline engine 12 and a motor-generator 14. An output shaft 16 of the gasoline engine 12 is coupled to an input shaft of a continuously variable transmission 18 incorporating a clutch, and the input shaft of the continuously variable transmission 18 is also coupled to an output shaft 20 of the motor-generator 14. Rotation of an output shaft 19 of the continuously variable transmission 18 is transmitted to axles 24FR, 24FL of front-right and front-left wheels through a front wheel differential 22, whereby front-right and front-left wheels 26FR, 26FL are rotated and driven.

The gasoline engine 12 and the motor-generator 14 of the hybrid engine 10 are controlled by an engine control device 28 in accordance with the depression stroke of an accelerator pedal (not shown) depressed by a driver and the vehicle running state. The motor-generator 14 also functions as a generator for a front wheel regenerative braking device 30, and is controlled by the engine control device 28.

In the exemplary embodiment, the hybrid engine 10 generates a driving force or an engine braking force, by the gasoline engine 12, or by the gasoline engine 12 and the motor-generator 14 in a normal running state when a shift lever (not shown) is in a D range, i.e., normal operation mode. The hybrid engine generates a driving force only by the motor-generator 14 when the shift lever is in the D range but the load is low (electric vehicle mode), and generates a driving force or an engine braking force by the gasoline engine 12 and the motor-generator 14 when the shift lever is in a B range as well. However, in the B range, the engine braking force is larger than in the D range, i.e., engine brake mode. Therefore, when the shift lever is in the D range and a brake pedal 32 is depressed by the driver, the motor-generator 14 also functions as a regenerative generator.

In FIG. 1, rotation of rear-right and rear-left wheels 34RR, 34RL is transmitted to a motor-generator 42 of a rear wheel regenerative braking device 40 by way of rear-right and rear-left wheel axles 36RR, 36RL and a rear wheel differential 38. Regenerative braking by the motor-generator 42 is also controlled by the engine control device 28. Thus, the engine control device 28 functions as a control device for the regenerative braking device 40.

A frictional braking force of each of the front-right and front-left wheels 26FR, 26FL and rear-right and rear-left wheels 34RR, 34RL is individually controlled as the braking pressure of a corresponding one of wheel cylinders 48FR, 48FL, 48RR, 48RL is controlled by a hydraulic circuit 46 of a frictional braking device 44. Although not shown, the hydraulic circuit 46 includes a reservoir, an oil pump, various valve devices, and the like. The braking pressure of each of the wheel cylinders is controlled by a braking control device 52 as a control device for the frictional braking device, in accordance with the depression stroke of the brake pedal 32 and the pressure applied to a master cylinder 50 that is driven in response to depression of the brake pedal 32.

A signal indicating a depression stroke of the accelerator pedal is input to the engine control device 28 from an accelerator pedal sensor 54. A signal indicating a shift position of the continuously variable transmission 18 is input to the engine control device 28 from a shift position sensor 56. Signals indicating a target regenerative braking force Fgft for the front wheels and a target regenerative braking force Fgrt for the rear wheels are input to the engine control device 28 from the braking control device 52.

A signal indicating a depression stroke Sp of the brake pedal 32 is input to the braking control device 52 from a stroke sensor 58. A signal indicating a pressure Pm applied to the master cylinder 50 is input to the braking control device 52 from a pressure sensor 60. A signal indicating a vehicle longitudinal acceleration Gx is input to the braking control device 52 from a longitudinal acceleration sensor 62. Signals indicating braking pressures Pfr, Pfl, Prr, Prl for the front-right, front-left, rear-right, and rear-left wheel cylinders 48FR, 48FL, 48RR, 48RL are input to the braking control device 52 from pressure sensors 64$fr$, 64$fl$, 64$rr$, 64$rl$ respectively. Signals indicating wheel speeds Vwfr, Vwfl, Vwrr, Vwrl of the front-right, front-left, rear-right, and rear-left wheels are input to the braking control device 52 from wheel speed sensors 66$fr$, 66$fr$, 66$rr$, 66$rl$ respectively.

In fact, it is appropriate that each of the engine control device 28 and the braking control device 52 be constructed, for example, as a generally employed unit composed of a microcomputer including a CPU, a ROM, a RAM, an I/O device and a drive circuit. The longitudinal acceleration sensor 62 detects a longitudinal vehicle acceleration Gx with the direction in which the vehicle is accelerated being defined as positive.

Figure 2:
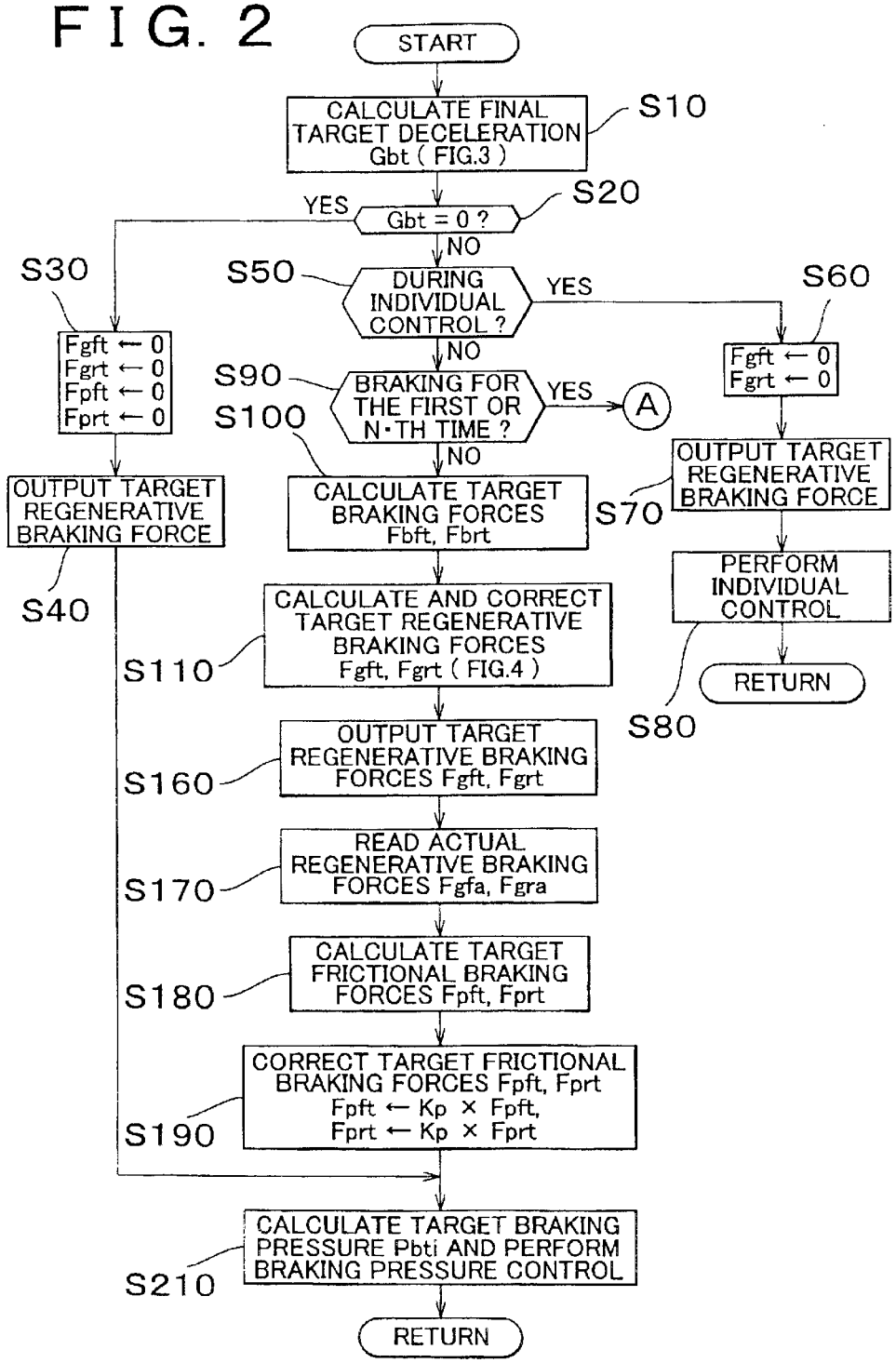
FIG. 2 is a flowchart showing a main routine of a braking force control performed by the braking control apparatus of the first exemplary embodiment.

As will be described later in detail, the braking control device 52 calculates a final target vehicle deceleration Gbt as a braking requirement of the driver on the basis of a depression stroke Sp of the brake pedal 32 and a master cylinder Pm according to a routine shown in FIG. 2. The braking control device 52 calculates target braking forces Fbft, Fbrt for the front and rear wheels on the basis of the final target deceleration Gbt and a predetermined braking force distribution ratio between the front and rear wheels. With maximum regenerative braking forces of the regenerative braking devices 30, 40 being defined as Fgfmax, Fgrmax respectively, the braking control device 52 calculates the smaller one of the target braking force Fgft and the maximum regenerative braking force Fgfrmax as the target regenerative braking force Fgft for the front wheels, calculates the smaller one of the target braking force Fbrt and the maximum regenerative braking force Fgrmax as the target regenerative braking force Fgrt for the rear wheels, and outputs signals indicating these target regenerative braking forces to the engine control device 28.

The engine control device 28 controls the motor-generator 14 of the regenerative braking device 30 for the front wheels with the target regenerative braking force Fgft for the front wheels being defined as an upper limit, and calculates an actual regenerative braking force Fgfa applied by the regenerative braking device 30 for the front wheels on the basis of a voltage and a current generated by the motor-generator 14. Similarly, the engine control device 28 controls a motor-generator 42 of the regenerative braking device 40 for the rear wheels with the target regenerative braking force Fgrt being defined as an upper limit, and calculates an actual regenerative braking force Fgra applied by the regenerative braking device 40 for the rear wheels on the basis of a voltage and a current generated by the motor-generator 42. Furthermore, the engine control device 28 outputs signals indicating the actual regenerative braking force Fgfa for the front wheels and the actual regenerative braking force Fgra for the rear wheels to the braking control device 52.

The braking control device 52 calculates a value obtained by subtracting the actual regenerative braking force Fgfa from the target braking force Fbft as a target frictional braking force Fpft, calculates a value obtained by subtracting the actual regenerative braking force Fgra from the target braking force Fbrt as a target frictional braking force Fprt for the rear wheels, calculates target braking pressures Pbtfr, Pbtfl for the right and left wheels on the basis of the target frictional braking force Fpft for the front wheels, calculates target braking pressures Pbtrr, Pbtrl for the rear-right and rear-left wheels on the basis of the target frictional braking force Fprt for the rear wheels, and controls braking pressures for the wheels such that each of braking pressures Pi (i=fr, fl, rr, rl) for the front-right and front-left wheels and the rear-right and rear-left wheels becomes equal to a corresponding one of target braking pressures Pbti (i=fr, fl, rr, rl).

The braking control device 52 calculates a vehicle speed Vb and braking slip amounts SLi (i=fr, fl, rr, rl) of the wheels on the basis of wheel speeds Vwi (i=fr, fl, rr, rl) of the wheels according to a know-how that is known in the technical field concerned. If the braking slip amount SLi of any one of the wheels becomes larger than a reference value SLa (positive constant) for starting an antiskid control (ABS control) so that a condition for starting the antiskid control is fulfilled, the braking control device 52 performs the antiskid control for increasing or reducing a pressure in a corresponding one of the wheel cylinders such that the braking slip amount of that one of the wheels is confined to a predetermined range, until the condition for terminating the antiskid control is fulfilled. If the antiskid control is being performed as to at least one of the front-right and front-left wheels, the braking control device 52 sets the target regenerative braking force Fgft for the front wheels as 0. If the antiskid control is being performed as to at least one of the rear-right and rear-left wheels, the braking control device 52 sets the target regenerative braking force Fgrt for the rear wheels as 0.

The braking control device 52 usually controls braking forces for the front and rear wheels in a cooperative braking mode realized by both regenerative braking based on the target regenerative braking forces Fgft, Fgrt and frictional braking based on the target braking forces Fbft, Fbrt. However, if the braking force for at least one of the front-right and front-left wheels or the braking force for at least one of the rear-right and rear-left wheels is individually controlled as in the case of the antiskid control, the braking control device 52 controls the braking forces for the front or rear wheels in a single braking mode realized only by frictional braking.

In this case, if the necessity to individually control the braking forces for the wheels tends to arise, for example, as in the case where the antiskid control is likely to be started, the braking control device 52 shifts a control mode of the braking forces from the cooperative braking mode to the single braking mode by gradually reducing the target regenerative braking forces Fgft, Fgrt to 0. If the individual control of the braking forces for the wheels has been completed, the braking control device 52 shifts the control mode of the braking forces from the single braking mode to the cooperative braking mode by gradually increasing the target regenerative braking forces Fgft, Fgrt.

In the first exemplary embodiment, if the braking control is performed for the first time or for the last time in a predetermined number of times, the braking control device 52 controls the braking forces for all the wheels in the single braking mode, calculates an average Gbta of predetermined cycles of a reference vehicle deceleration Gbt on the basis of a braking operation amount of the driver, calculates an average Gbxa of predetermined cycles of an actual vehicle deceleration Gbx, and calculates a ratio of the average Gbta to the average Gbxa as a correction coefficient Kp for the target frictional braking forces Fpft, Fprt.

The braking control device 52 corrects target frictional braking forces by multiplying the target frictional braking forces Fpft, Fprt by the correction coefficient Kp. If it is assumed that $\mu d$ represents a designed friction coefficient of a frictional member of the frictional braking device, which is regarded as a macro value for the four wheels, and that $\mu a$ represents an actual friction coefficient, the correction coefficient Kp corresponds to $\mu d/\mu a$. Thus, the correction coefficient Kp is a coefficient for compensating for a decrease in the actual friction coefficient $\mu a$ with respect to the designed friction coefficient $\mu d$ by increasing a frictional braking force.

A braking force control routine executed by the braking control device 52 in this exemplary embodiment will now be described with reference to flowcharts shown in FIGS. 2 to 5. The controls based on the flowcharts shown in FIGS. 2 to 5 are started by turning an ignition switch (not shown) on and are repeatedly executed at intervals of a predetermined period.

Figure 3:
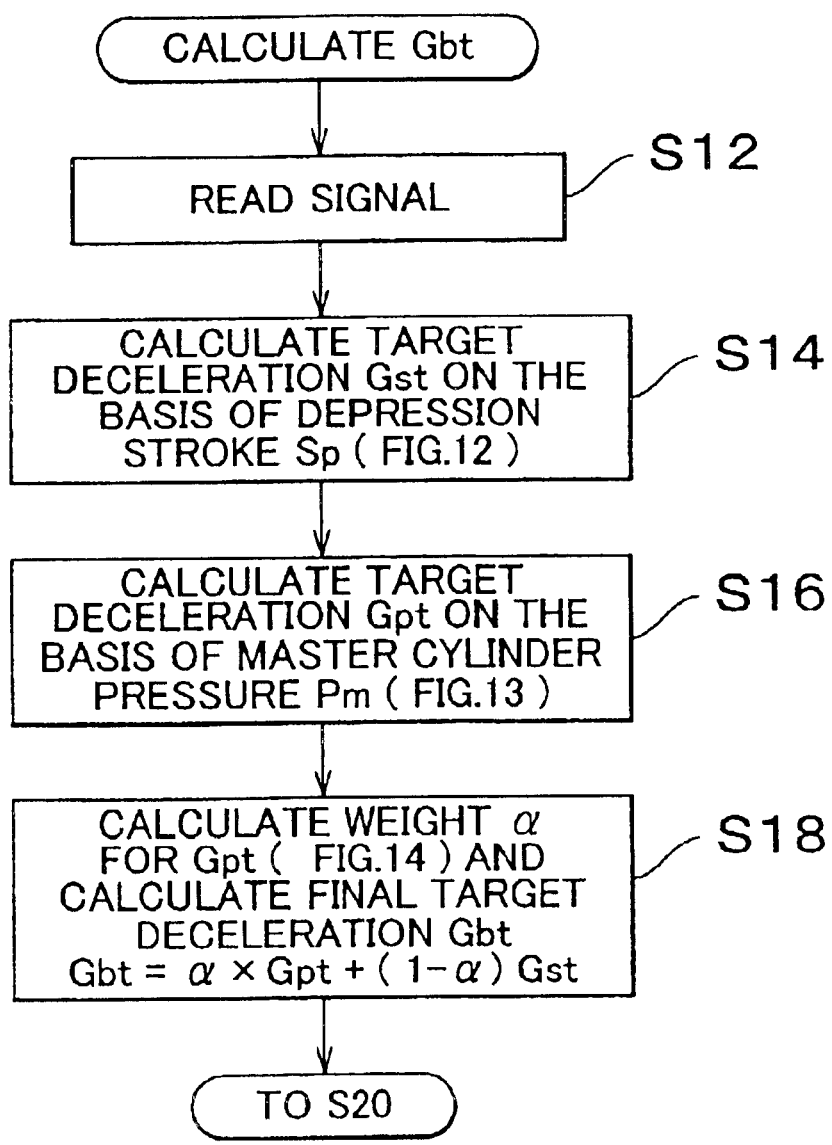
FIG. 3 is a flowchart showing a routine for calculating a final target deceleration Gbt in step 10.

In step 10, a final target vehicle deceleration Gbt as a braking amount required by the driver is calculated according to the flowchart shown in FIG. 3. It is determined in step 20 whether the final target deceleration Gbt is 0, i.e., whether a braking requirement has been made by the driver. If the determination in step 20 gives the negative result, i.e., if it is determined that the driver wants braking, the operation proceeds to step 50. If the determination in step 20 gives the affirmative result, the operation proceeds to step 30.

In step 30, the target regenerative braking forces Fgft, Fgrt for the front and rear wheels are set as 0, and the target frictional braking forces Fpft, Fprt for the front and rear wheels are set as 0. In step 40, signals indicating the target regenerative braking forces Fgft, Fgrt (=0) for the front and rear wheels are output to the engine control device 28. The operation then proceeds to step 210.

It is determined in step 50 whether braking forces for the wheels are being individually controlled, as in the case of the antiskid control, for example. If the determination in step 50 gives the negative result, the operation proceeds to step 90. If the determination in step 50 gives the affirmative result, the target regenerative braking forces Fgft, Fgrt for the front and rear wheels are set as 0 in step 60. In step 70, signals indicating the target regenerative braking forces Fgft, Fgrt (=0) for the front and rear wheels are output to the engine control device 28. In step 80, braking forces for the wheels are individually controlled on the basis of target control amounts of individual controls, as in the case of the antiskid control, for example. The operation then returns to step 10.

In step 90, on the assumption that a shift of the determination in step 20 from the negative result to the affirmative result is counted as one braking control, it is determined whether the present braking control is the first or $N^{th}$ (e.g., N=20, 40, 60 . . . ) since the ignition switch has been turned on, i.e., whether the correction coefficient Kp for correcting the target frictional braking force needs to be calculated and updated. If the determination in step 90 gives the affirmative result, the operation proceeds to step 220 shown in FIG. 5. If the determination in step 90 gives the negative result, the operation proceeds to step 100.

In step 100, on the assumption that Kf and Kr represent distribution ratios (positive coefficients) of braking forces for the front and rear wheels, the target braking force Fbft for the front wheels and the target braking force Fbrt for the rear wheels are respectively calculated according to equations (1) and (2) shown below.

$$Fbft = Kf \times Gbt \quad (1)$$

$$Fbrt = Kr \times Gbt \quad (2)$$

Figure 4:
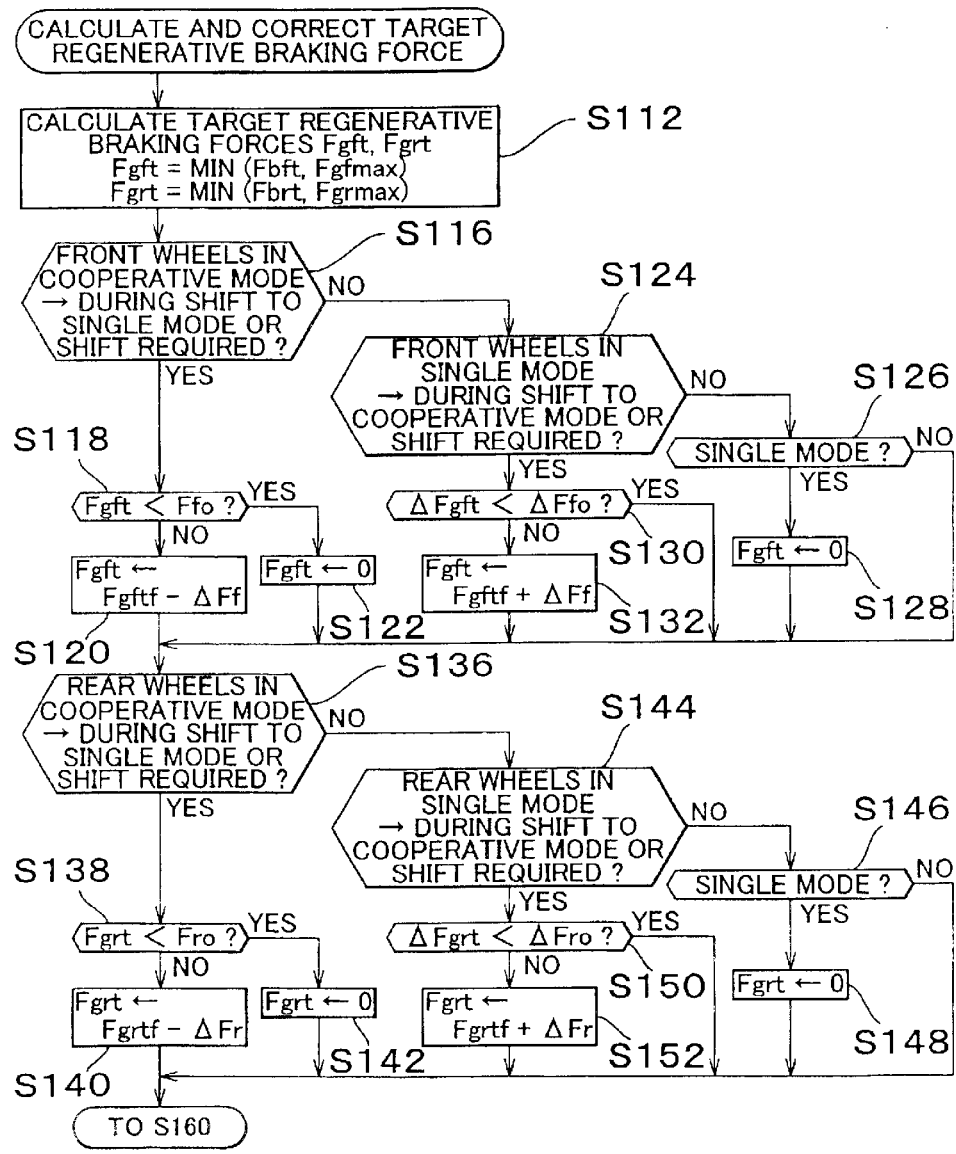
FIG. 4 is a flowchart showing a routine for correcting target regenerative braking forces Fgft, Fgrt in step 110.

In step 110, a target regenerative braking force Fgft for the front wheels and a target regenerative braking force Fgrt for the rear wheels are calculated according to the flowchart shown in FIG. 4 and are corrected by the correction coefficient Kp. In step 160, signals indicating the post-correction target regenerative braking forces Fgft, Fgrt are output to the engine control device 28.

In step 170, as will be described later, signals indicating the actual regenerative braking force Fgfa for the front wheels and the actual regenerative braking force Fgra for the rear wheels, which have been achieved by the regenerative braking control by the engine control device 28, are read by the engine control device 28. In step 180, a target frictional braking force Fpft for the front wheels and a target frictional braking force Fprt for the rear wheels are respectively calculated according to equations (3) and (4) shown below.

$$Fpft = Fbft - Fgfa \quad (3)$$

$$Fprt = Fbrt - Fgra \quad (4)$$

In step 190, the target frictional braking force Fpft for the front wheels and the target frictional braking force Fprt for the rear wheels are multiplied by the correction coefficient Kp, whereby a post-correction target frictional braking force Fpft for the front wheels and a post-correction target frictional braking force Fprt for the rear wheels are calculated.

In step 210, target braking pressures Pbtfr, Pbtfl for the front-right and front-left wheels are calculated on the basis of the target frictional braking force Fpft for the front wheels, and target braking pressures Pbtrr, Pbtrl for the rear-right and rear-left wheels are calculated on the basis of the target frictional braking force Fprt for the rear wheels. In step 210 as well, braking pressures for the wheels are controlled by pressure feedback so that each of the braking pressures Pi for the front-right and front-left wheels and the rear-right and rear-left wheels becomes equal to a corresponding one of target braking pressures Pbti. The operation then returns to step 10.

Figure 5:
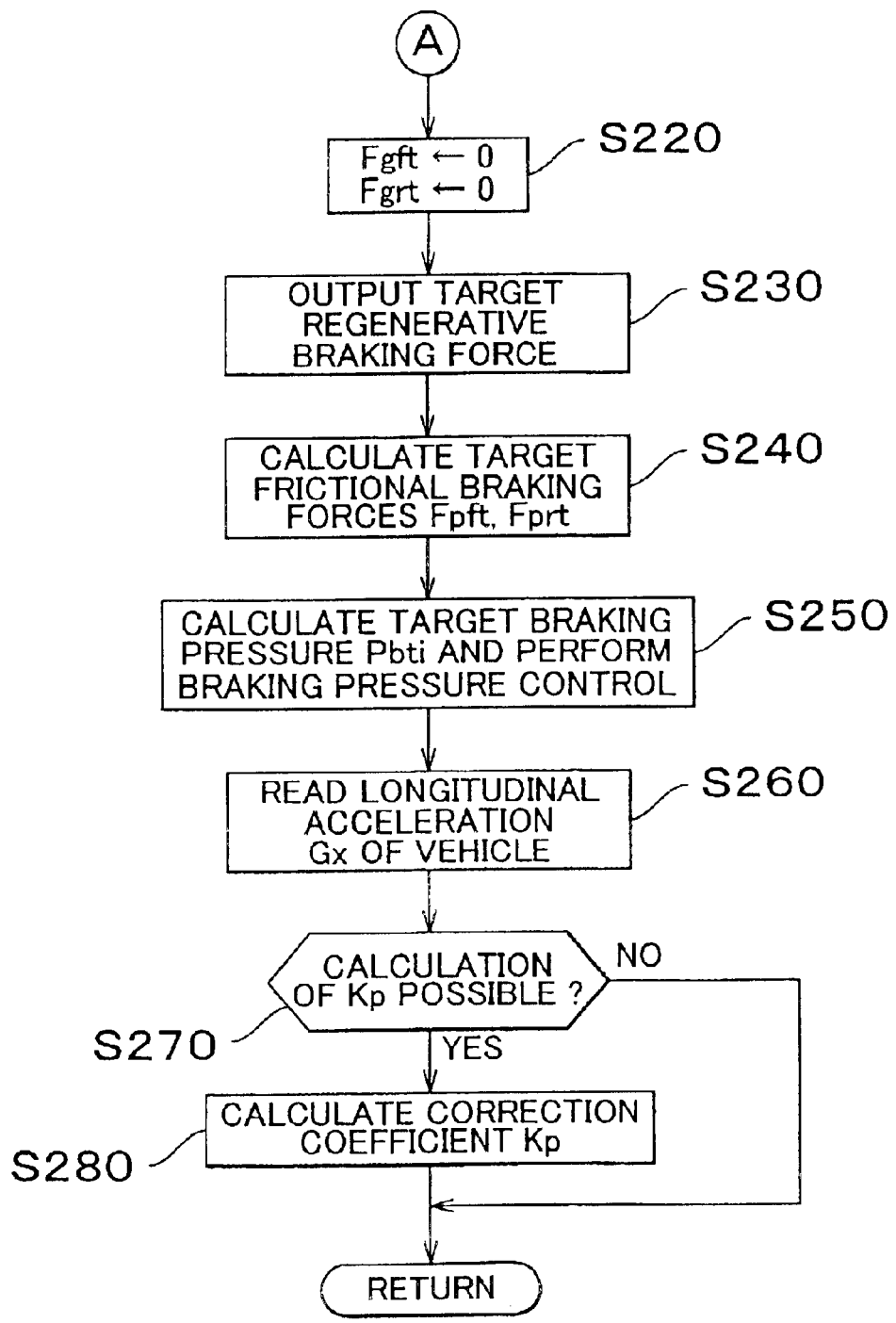
FIG. 5 is a flowchart showing a routine for calculating a correction coefficient Kp for target frictional braking forces in the first exemplary embodiment.

As shown in FIG. 5, the target regenerative braking forces Fgft, Fgrt for the front and rear wheels are set as 0 in step 220. In step 230, signals indicating the target regenerative braking forces Fgft, Fgrt (=0) for the front and rear wheels are output to the engine control device 28. In step 240, the target frictional braking force Fpft for the front wheels and the target frictional braking force Fprt for the rear wheels are set as the target braking force Fbft for the front wheels and the target braking force Fbrt for the rear wheels respectively.

In step 250, as in the case of the aforementioned step 210, target braking pressures Pbtfr, Pbtfl for the front-right and front-left wheels are calculated on the basis of the target frictional braking force Fpft for the front wheels, and target braking pressures Pbtrr, Pbtrl for the rear-right and rear-left wheels are calculated on the basis of the target frictional braking force Fprt for the rear wheels. In step 250 as well, braking pressures for the wheels are controlled by pressure feedback such that each of the braking pressures Pi for the front-right and front-left wheels and the rear-right and rear-left wheels becomes equal to a corresponding one of the braking pressures for the wheels.

In step 260, a signal indicating the vehicle longitudinal acceleration Gx detected by the longitudinal acceleration sensor 62 is read, and the vehicle deceleration Gbx is set as −Gx on the basis of the longitudinal acceleration Gx.

It is determined in step 270 whether data on the actual deceleration Gbx and the final target deceleration Gbt corresponding to the latest predetermined cycles have been accumulated, i.e., whether the correction coefficient Kp for the target frictional braking forces can be calculated. If the determination in step 270 gives the negative result, the operation returns to step 10. If the determination in step 270 gives the affirmative result, an average Gbta of the final target deceleration Gbt corresponding to the latest predetermined cycles and an average Gbxa of the actual vehicle deceleration Gbx(=−Gx) corresponding to the latest predetermined cycles are calculated in step 280, and the correction coefficient Kp for the target frictional braking forces is calculated in step 280 according to an equation (5) shown below.

$$Kp = Gbta/Gbxa \quad (5)$$

Figure 12:
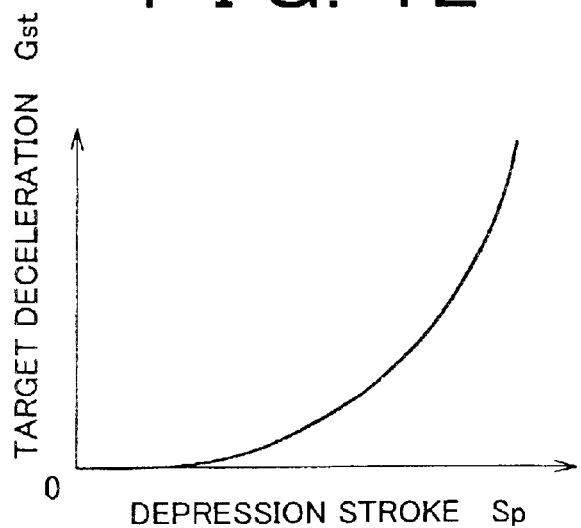
FIG. 12 is a graph showing a relationship between a depression stroke Sp of a brake pedal and a target deceleration Gst.
Figure 13:
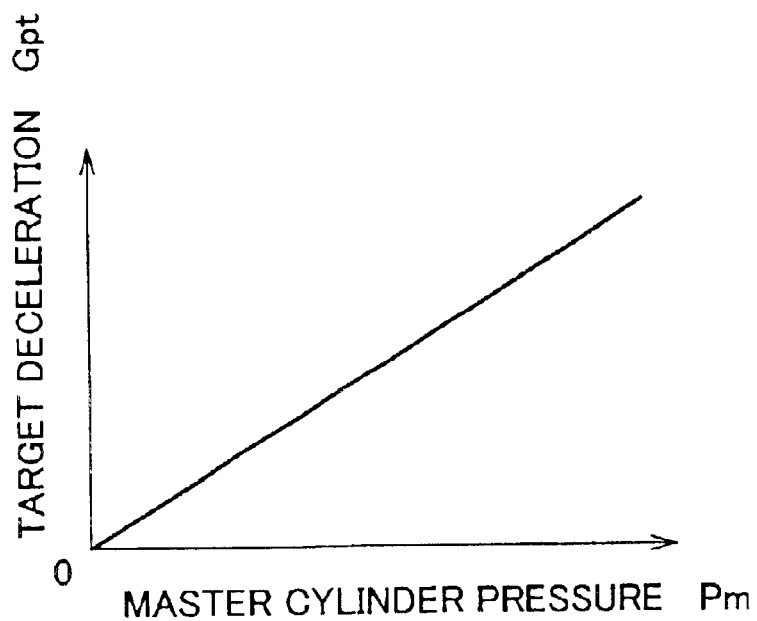
FIG. 13 is a graph showing a relationship between a master cylinder pressure Pm and a target deceleration Gpt.

In step 12 of the routine for calculating the final target vehicle deceleration Gbt shown in FIG. 3, a signal indicating a depression stroke Sp of the brake pedal 32 detected by the stroke sensor 58 and a signal indicating a pressure Pm of the master cylinder 50 detected by the pressure sensor 60 are read. In step 14, a target vehicle deceleration Gst based on the depression stroke Sp is calculated from a map corresponding to a graph shown in FIG. 12. In step 16, a target vehicle deceleration Gpt based on the master cylinder pressure Pm is calculated from a map corresponding to a graph shown in FIG. 13.

Figure 14:
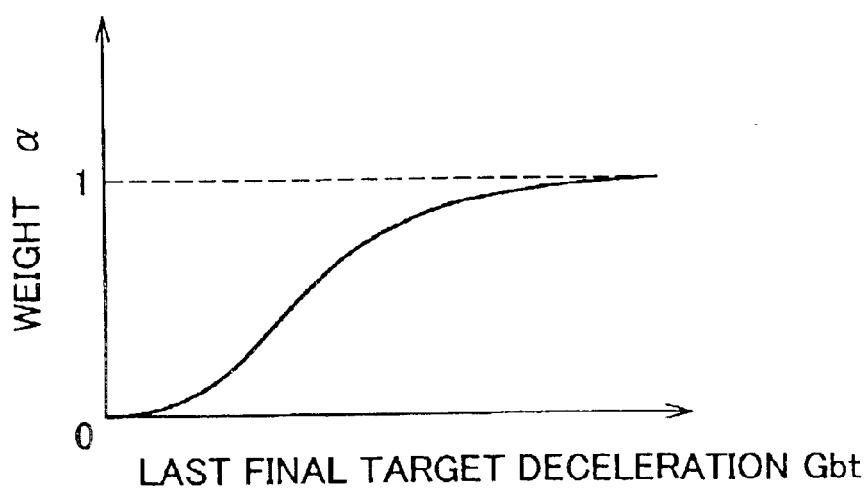
FIG. 14 is a graph showing a relationship between a last-calculated final target deceleration Gbt and a weight a for the target deceleration Gpt.

In step 18, a weight α(0≦α≦1) for the target deceleration Gpt based on the master cylinder pressure Pm is calculated from a map corresponding to a graph shown in FIG. 14 on the basis of the final target deceleration Gbt calculated in a previous cycle, and a final target vehicle deceleration Gbt is calculated as a weighted sum of the target deceleration Gpt and the target deceleration Gst according to an equation (6) shown below.

$$Gbt = \alpha \times Gpt + (1-\alpha) \times Gst \quad (6)$$

In step 112 of the target regenerative braking force calculating routine shown in FIG. 4, a target regenerative braking force Fgft for the front wheels and a target regenerative braking force Fgrt for the rear wheels are respectively calculated according to equations (7) and (8) shown below. It is to be noted in the following equations (7) and (8) that MIN means the smaller one of the values in parentheses. Although maximum regenerative braking forces Fgfmax, Fgrmax may be positive constants, they may also be changed in accordance with the operation mode of the hybrid engine 10 or the vehicle speed.

$$Fgft = \text{MIN}(Fbft, Fgfr \text{ max}) \quad (7)$$

$$Fgrt = \text{MIN}(Fbrt, Fgr \text{ max}) \quad (8)$$

It is determined in step 116 whether or not the front wheels are being shifted from the cooperative braking mode to the single braking mode or whether the aforementioned shift of the modes is required, for example on the ground that the antiskid control is likely to be started as to at least one of the front-right and front-left wheels. If the determination in step 116 gives the negative result, the operation proceeds to step 124. If the determination in step 116 gives the affirmative result, the operation proceeds to step 118.

It is determined in step 118 whether the target regenerative braking force Fgft for the front wheels is smaller than a reference value Ff0 (a positive constant close to 0), i.e., whether gradual reduction of the target regenerative braking force Fgft for the front wheels has been completed. If the determination in step 118 gives the negative result, the target regenerative braking force Fgft for the front wheels is set as Fgftf−ΔFf on the assumption that Fgftf represents a last value of the target regenerative braking force for the front wheels and that ΔFf represents a very small positive constant. If the determination in step 118 gives the affirmative result, that is, if it has been determined that the shift from the cooperative braking mode to the single braking mode has been completed, the target regenerative braking force Fgft for the front wheels is set as 0 in step 122.

It is determined in step 124 whether the front wheels are in a shift from the single braking mode to the cooperative braking mode or whether the aforementioned shifts of the modes is required because the antiskid control has been terminated, for example, after the performance thereof. If the determination in step 124 gives the affirmative result, the operation proceeds to step 130. If the determination in step 124 gives the negative result, the operation proceeds to step 126.

It is determined in step 126 whether the front wheels are being subjected to the braking control in the single braking mode. If the determination in step 126 gives the affirmative result, the target regenerative braking force Fgft for the front wheels is set as 0 in step 128. If the determination in step 126 gives the negative result, i.e., if it is determined that the front wheels are being subjected to the braking control in the cooperative braking mode, the operation immediately proceeds to step 136.

In step 130, a difference ΔFgft(=Fbftf−Fgftf) between the last target braking force Fbftf for the front wheels and the last target regenerative braking force Fgftf for the front wheels is calculated, and it is determined whether or not the difference ΔFgft is smaller than a reference value ΔFf0 (a positive constant), i.e., whether gradual augmentation of the target regenerative braking force Fgft for the front wheels has been completed. If the determination in step 130 gives the negative result, the target regenerative braking force Fgft for the front wheels is incremented by ΔFf in step 132. If the determination in step 130 gives the affirmative result, i.e., if it is determined that the shift from the single braking mode to the cooperative braking mode has been completed, the operation immediately proceeds to step 136.

In steps 136 to 152, the target regenerative braking force Fgrt for the rear wheels is corrected by substantially the same method as in the aforementioned steps 116 to 132, except that the target regenerative braking force Fgft for the front wheels is replaced by the target regenerative braking force Fgrt for the rear wheels, that the last target regenerative braking force Fgftf for the front wheels is replaced by the last target regenerative braking force Fgrtf for the rear wheels, that the difference ΔFgft is replaced by the difference (=Fbrtf−Fgrtf) between the last target braking force Fbrtf for the rear wheels and the last target regenerative braking force Fgrtf for the rear wheels, that the reference values Ff0 and ΔFf0 are replaced by the reference values Fr0 and ΔFr0 (which are both positive constants close to 0), and that a change amount ΔFf is replaced by a change amount ΔFr (a very small positive constant).

Figure 6:
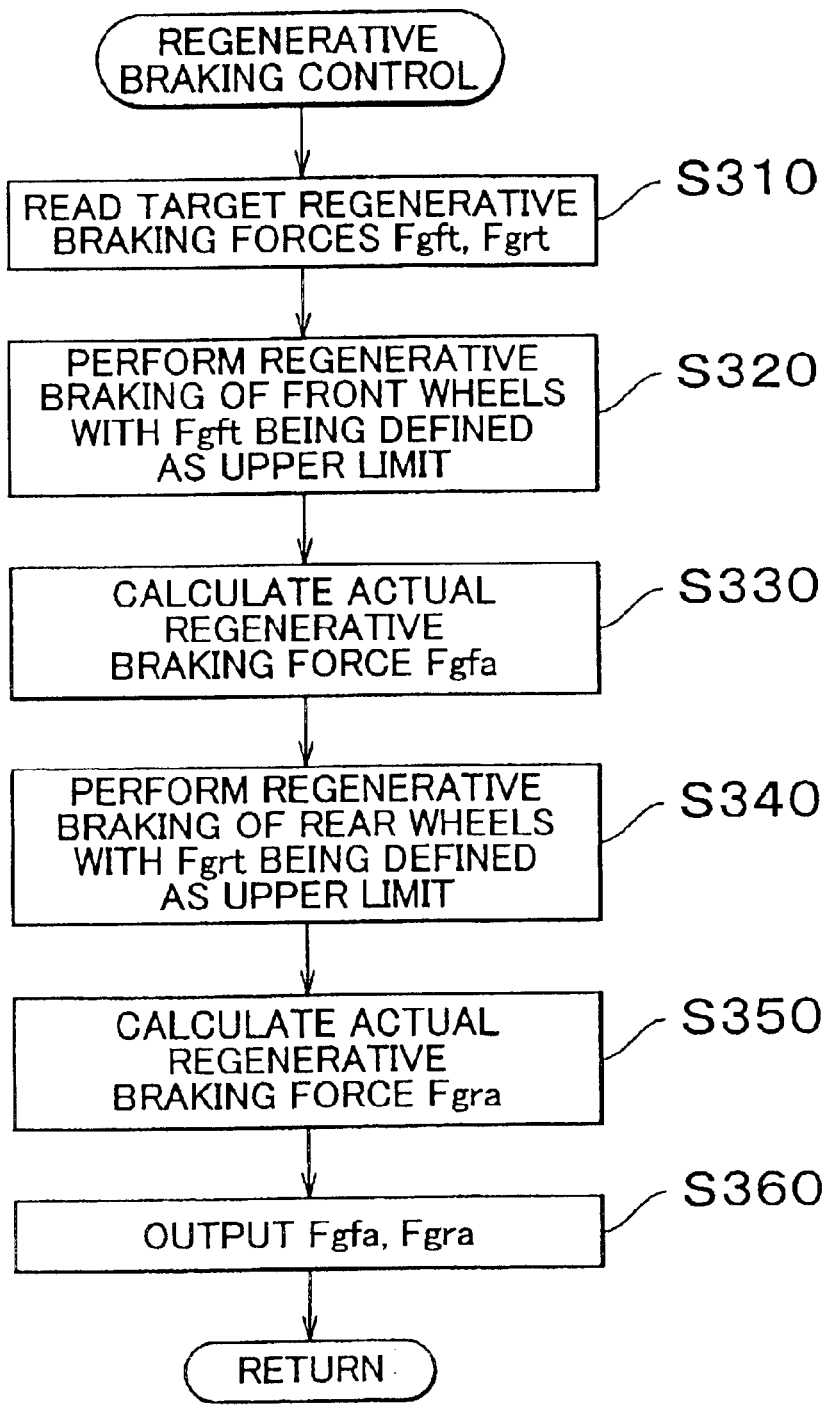
FIG. 6 is a flowchart showing a routine of a regenerative braking control performed by an engine control device of the first exemplary embodiment.

A regenerative braking control routine executed by the engine control device 28 in the exemplary embodiment will now be described with reference to a flowchart shown in FIG. 6. The control according to the flowchart shown in FIG. 6 is also started by turing an ignition switch (not shown) ON and is repeatedly executed at intervals of a predetermined period.

In step 310, signals indicating the target regenerative braking force Fgft for the front wheels and the target regenerative braking force Fgrt for the rear wheels are read by the braking control device 52. In step 320, regenerative braking by the regenerative braking device 30 for the front wheels is performed with the target regenerative braking force Fgft being defined as an upper limit. In step 330, an actual regenerative braking force Fgfa for the front wheels applied by the regenerative braking device 30 for the front wheels is calculated.

Similarly, in step 340, regenerative braking by the regenerative braking device 40 for the rear wheels is performed with the target regenerative braking force Fgrt being defined as an upper limit. In step 350, an actual regenerative braking force Fgra for the rear wheels applied by the regenerative braking device 40 for the rear wheels is calculated. In step 360, signals indicating the actual regenerative braking force Fgfa for the front wheels and the actual regenerative braking force Fgra for the rear wheels are output to the braking control device 52. The operation then returns to step 310.

Thus, according to the first exemplary embodiment, the final target vehicle deceleration Gbt, i.e., the reference vehicle deceleration based on an amount of braking operation performed by the driver is calculated in step 20 on the basis of the depression stroke Sp of the brake pedal 32 and the master cylinder pressure Pm.

In step 100, the target braking force Fbft for the front wheels and the target braking force Fbrt for the rear wheels are calculated on the basis of a predetermined braking force distribution ratio between the front and rear wheels and the final target vehicle deceleration Gbt. In step 110, the target regenerative braking force Fgft for the front wheels is calculated as the smaller one of the target braking force Fbft and the maximum regenerative braking force Fgrmax, and the target regenerative braking force Fgrt for the rear wheels is calculated as the smaller one of the target braking force Fbrt and the maximum regenerative braking force Fgrmax. In step 160, signals indicating these target regenerative braking forces are output to the engine control device 28.

In step 320 of the regenerative braking routine shown in FIG. 6, the motor-generator 14 of the regenerative braking device 30 for the front wheels is controlled with the target regenerative braking force Fgft for the front wheels being defined as an upper limit. In step 330, an actual regenerative braking force Fgfa applied by the regenerative braking device 30 for the front wheels is calculated on the basis of a voltage and a current generated by the motor-generator 14. In step 340, the engine control device 28 controls the motor-generator 42 for the regenerative braking device 40 for the rear wheels with the target regenerative braking force Fgrt for the rear wheels being defined as an upper limit. In step 350, an actual regenerative braking force Fgra applied by the regenerative braking device 40 for the rear wheels is calculated on the basis of a voltage and a current generated by the motor-generator 42.

In steps 170 and 180, the target frictional braking force Fpft for the front wheels is calculated as a value obtained by subtracting the actual regenerative braking force Fgfa from the target braking force Fbft, and the target frictional braking force Fprt for the rear wheels is calculated as a value obtained by subtracting the actual regenerative braking force Fgra from the target braking force Fbrt. In step 210, target braking pressures Pbtfr, Pbtfl for the front-right and front-left wheels are calculated on the basis of the target frictional braking force Fpft for the front wheels, and the target braking pressures Pbtrr, Pbtrl for the rear-right and rear-left wheels are calculated on the basis of the target frictional braking force Fprt for the rear wheels. Also, in step 210, braking pressures for the wheels are controlled in a feedback manner such that each of the braking pressures Pi for the front-right and front-left wheels and the rear-right and rear-left wheels becomes equal to a corresponding one of the target braking pressures Pbti.

As described above, braking forces for the wheels are usually controlled in the cooperative braking mode realized by regenerative braking and frictional braking. However, if braking forces for the front wheels and the rear wheels are individually controlled, as in the case where the antiskid control is being performed, for example, the determination in step 50 gives the affirmative result. By performing the processes in steps 60 to 80, the braking force control mode is shifted to the single braking mode realized only by frictional braking, and braking forces for the wheels are individually controlled.

If the necessity to individually control braking forces for the wheels arises, the target regenerative braking forces Fgft, Fgrt are gradually reduced to 0 in step 110, i.e., in steps 112 to 152 shown in FIG. 4, whereby the braking force control mode is shifted from the cooperative braking mode to the single braking mode. If the individual control of the braking forces for the wheels has been completed, the target regenerative braking forces Fgft, Fgrt are gradually increased, whereby the braking force control mode is returned from the single braking mode to the cooperative braking mode.

In the first exemplary embodiment, if the braking force control is performed for the first or $N^{th}$ time, the determination in step 90 gives the affirmative result. The processes in steps 220 to 280 are then performed, whereby the braking forces are controlled in the single braking mode realized only by frictional braking. At this moment, an average Gbta of the final target vehicle deceleration Gbt corresponding to predetermined cycles and an average Gbxa of the actual vehicle deceleration Gbx corresponding to predetermined cycles are calculated, and the correction coefficient Kp for the target frictional braking forces Fpft, Fprt is calculated as a ratio of Gbta to Gbxa. In step 190, the target frictional braking forces Fpft, Fprt are corrected by being multiplied by Kp.

Thus, even if a situation in which an actually generated frictional braking force decreases with respect to a target frictional braking force, for example, due to a decrease in the friction coefficient of a frictional member of a frictional braking device, a frictional braking force corresponding to an original target frictional braking force is generated by multiplying the target frictional braking forces Fpft, Fprt by Kp. Therefore, a braking force for the entire vehicle can be controlled so as to precisely correspond to an amount of braking operation performed by the driver regardless of the control mode of the braking force. Even in the case where the braking force control mode is shifted between the cooperative braking mode and the single braking mode, the braking force for the entire vehicle can be reliably prevented from fluctuating, whereby a passenger in the vehicle can be reliably prevented from feeling a sense of incongruity.

Further, according to the first exemplary embodiment, if the friction coefficient $\mu a$ of the frictional member of the frictional braking device decreases with respect to the designed friction coefficient $\mu d$, the target frictional braking forces Fpft, Fprt are multiplied by Kp=$\mu d/\mu a$, whereby the frictional braking forces are generated as they originally should have been. Hence, the total braking force for the vehicle becomes equal to a value that always precisely corresponds to an amount of braking operation performed by the driver irrespective of aging of the frictional member, i.e., a value in the case where there is no decrease in the friction coefficient of the frictional member.

Figure 15:
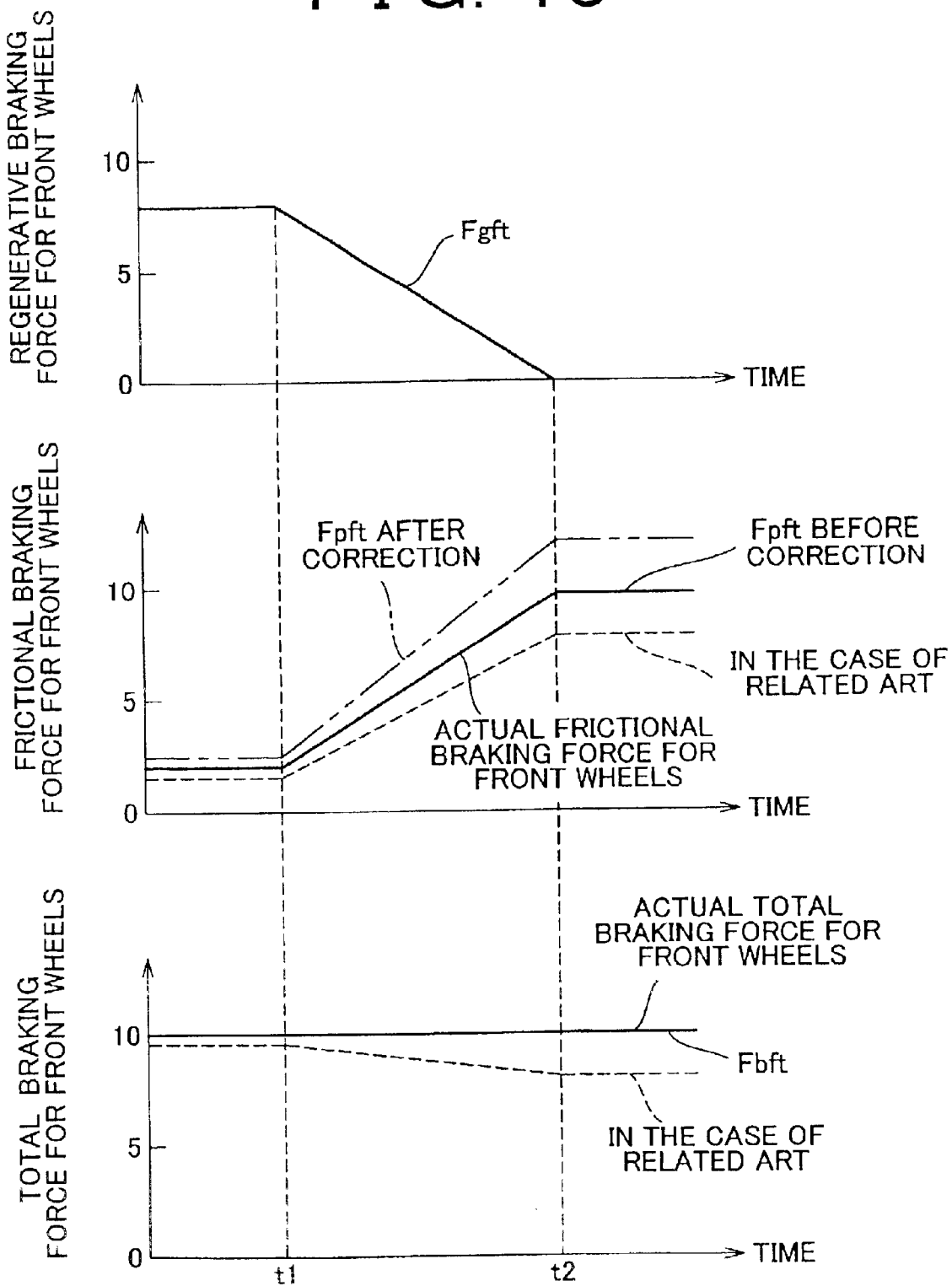
FIG. 15 is a graph showing an operation of the first exemplary embodiment in the case where the front wheels shift from a cooperative braking mode to a single braking mode, in the form of comparison with a case of the related art.

For example, FIG. 15 is a graph showing an operation of the first exemplary embodiment in the case where the front wheels shift from the cooperative braking mode to the single braking mode realized only by frictional braking, compared to the related art.

It is assumed in FIG. 15 that the amount of braking operation performed by the driver is constant, that the target braking force Fbft for the front wheels is 10 (in an arbitrary unit), that the braking force for the front wheels is controlled in the cooperative braking mode until time t1, that the control mode shifts from the cooperative braking mode to the single braking mode between t1 and a time t2, and that the braking force for the front wheels is controlled in the single braking mode after the timing t2.

The target regenerative braking force Fgft in the cooperative braking mode is 8 (see a top stage of the graph shown in FIG. 15). Therefore, the target frictional braking force Fpft for the front wheels is 2 (see a middle stage of the graph shown in FIG. 15). If it is assumed that the friction coefficient pa of the frictional members of the frictional braking devices for the front and rear wheels has dropped to 80% of its designed value $\mu d$, the actual frictional braking force for the front wheels in the cooperative braking mode is 2×0.8= 1.6, and the actual frictional braking force for the front wheels in the single braking mode is 10×0.8=8. The actual frictional braking force for the front wheels changes as indicated by a broken line in the middle stage of FIG. 15. As a result, the total braking force for the front wheels changes as indicated by a broken line in the lower stage of FIG. 15, whereby the vehicle deceleration also becomes 80% of a reference deceleration corresponding to the amount of braking operation performed by the driver.

Thus, in the case of the braking force control apparatus of the related art, while the braking mode shifts from the cooperative braking mode to the single braking mode, the actual frictional braking force for the front wheels gradually increases from 1.6 to 8, and the regenerative braking force gradually decreases from 8 to 0. Hence, the total braking force for the front wheels decreases from 9.6 to 8. As a result, the vehicle deceleration abruptly changes during a shift of the braking mode between the timings t1 and t2.

In contrast, according to the first exemplary embodiment, the correction coefficient Kp is calculated as a ratio of the average Gbta of the final target vehicle deceleration corresponding to the predetermined cycles to the average Gbxa of the actual vehicle deceleration corresponding to the predetermined cycles in the single braking mode. The correction coefficient Kp is 1/0.8=1.25, and as indicated by an alternate long and two short dashes line in the middle stage of FIG. 15, the target frictional braking force Fpft for the front wheels is corrected by being multiplied by 1.25.

Accordingly, the target frictional braking force Fpft for the front wheels is 2×1.25=2.5 in the cooperative braking mode, and 10×1.25=12.5 in the single braking mode. That is, the target frictional braking force Fpft gradually increases from 2.5 to 12.5 during a shift from the cooperative braking mode to the single braking mode. Hence, the actual frictional braking force for the front wheels is 2.5×0.8=2 in the cooperative braking mode, and the regenerative braking force is 8. Thus, the total braking force is 2+8=10. If the single braking mode is thereafter entered, the total braking force consists only of the actual frictional braking force for the front wheels and thus is 12.5×0.8=10. Thus, the total braking force for the front wheels is constantly equal to its target value of 10. Even when the braking mode shifts from the cooperative braking mode to the single braking mode, the vehicle deceleration can be reliably prevented from fluctuating.

Figure 7:
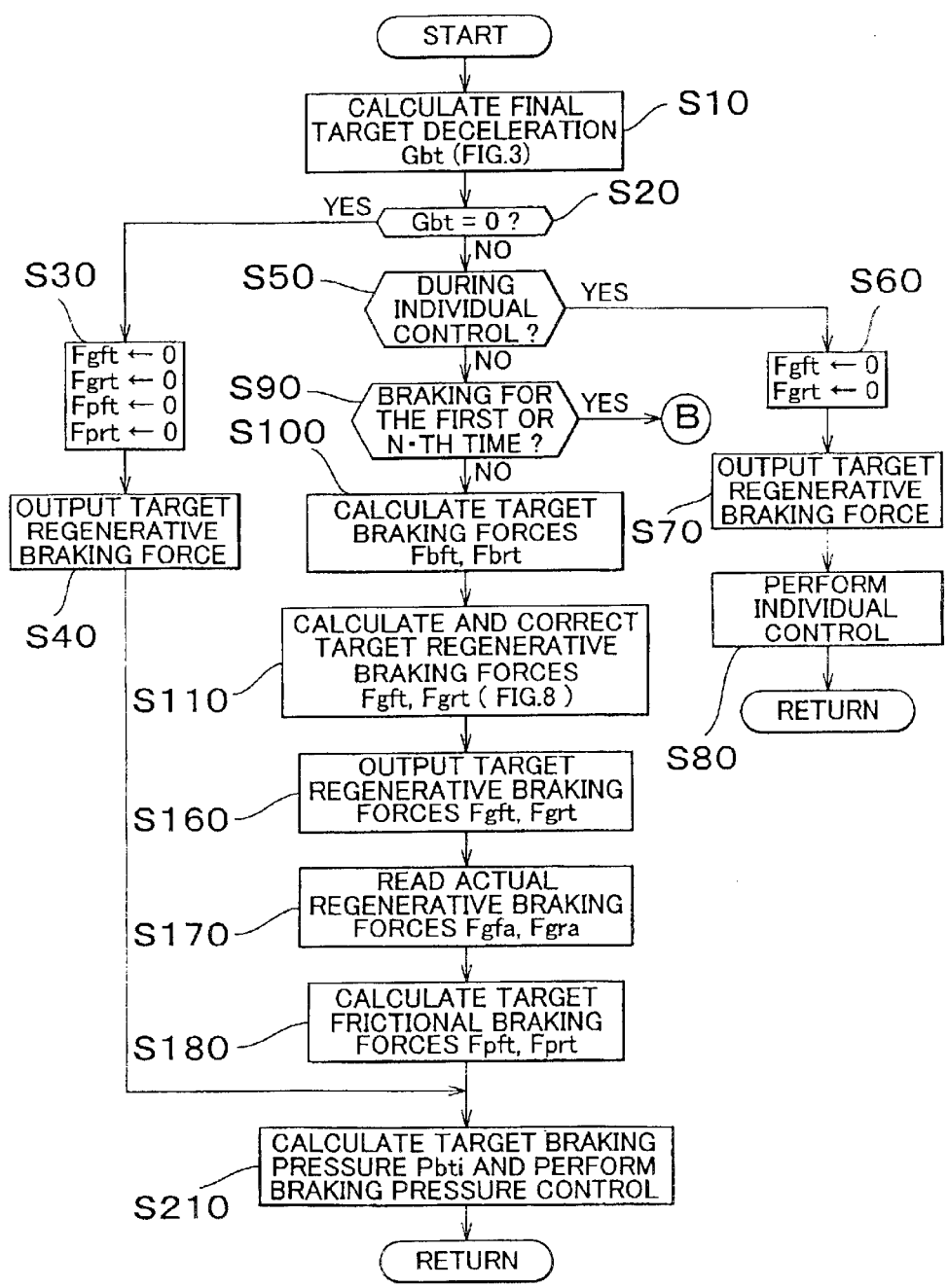
FIG. 7 is a flowchart showing a main routine of a braking force control performed by a braking control apparatus according to a second exemplary embodiment of the invention.
Figure 8:
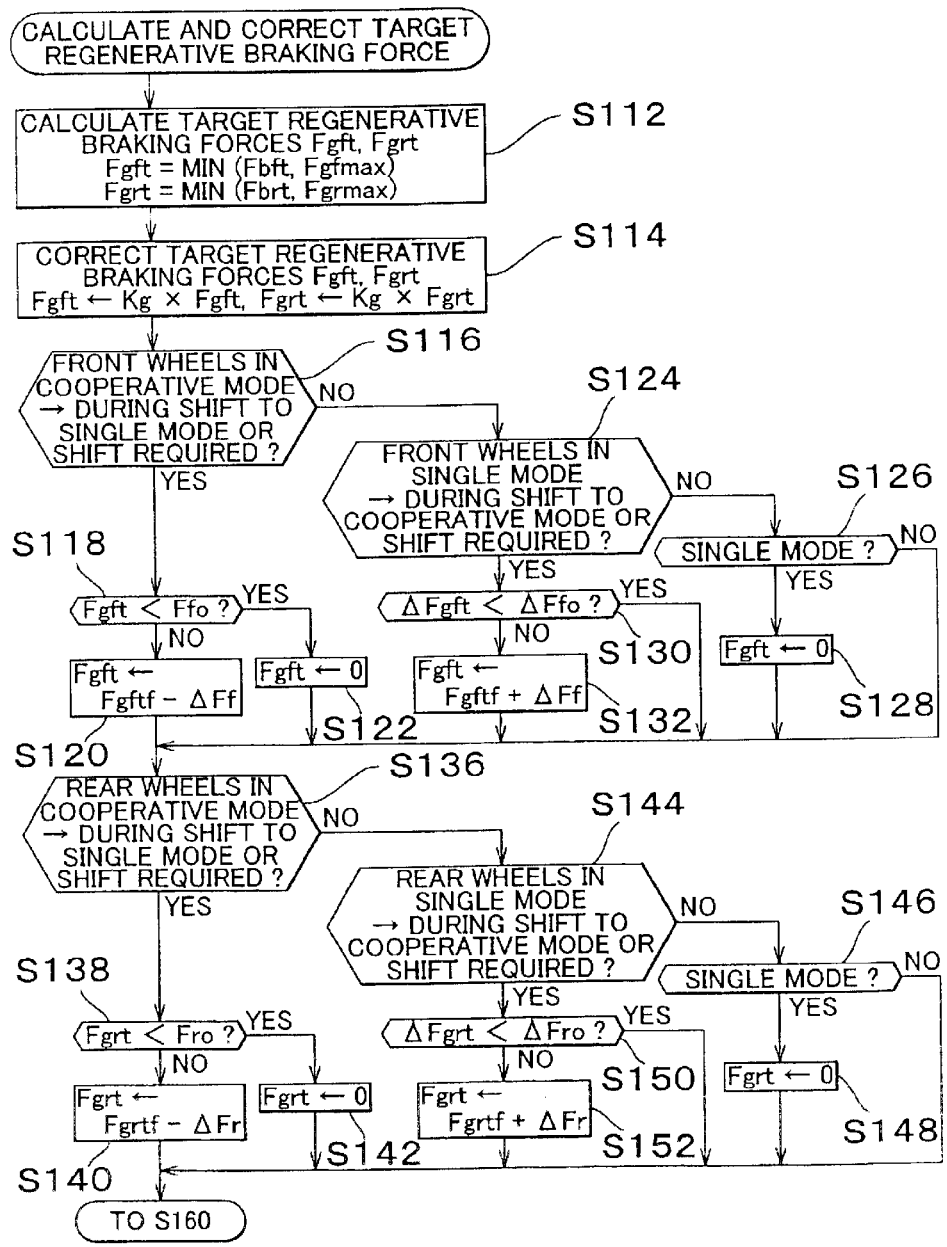
FIG. 8 is a flowchart showing a routine for calculating and correcting target regenerative braking forces Fgft, Fgrt in the second exemplary embodiment.
Figure 9:
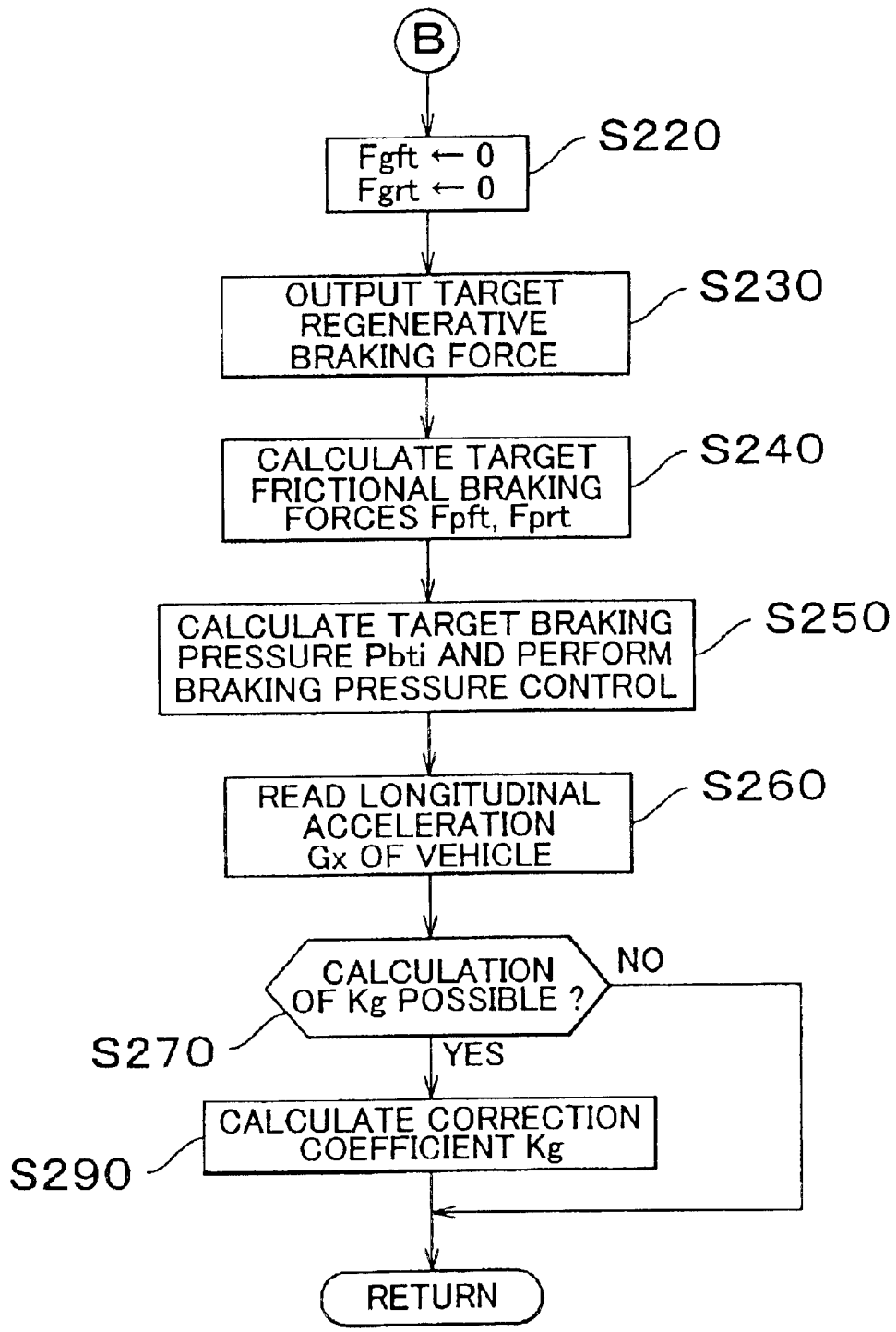
FIG. 9 is a flowchart showing a routine for calculating a correction coefficient Kg for target regenerative braking forces in the second exemplary embodiment.

FIG. 7 is a flowchart showing a main routine of a braking force control performed by a braking control apparatus according to a second exemplary embodiment of the invention, which is applied to a front-drive vehicle that has a regenerative braking device and a frictional braking device for front wheels and a regenerative braking device and a frictional braking device for rear wheels and that is equipped with a hybrid engine. FIG. 8 is a flowchart showing a routine for calculating and correcting target regenerative braking forces Fgft, Fgrt. FIG. 9 is a flowchart showing a routine for calculating a correction coefficient Kg. It is to be noted in FIGS. 7 to 9 that steps corresponding to those in FIGS. 2, 4, and 5 are denoted by the same numbers.

In the second exemplary embodiment, a correction of the target frictional braking force corresponding to step 190 of the first exemplary embodiment is not performed. If the determination in step 90 gives the affirmative result, the processings in steps 220 to 290, shown in FIG. 9, are performed. In particular, it is determined in step 270 whether data on the actual deceleration Gbx and the final target deceleration Gbt corresponding to the latest predetermined cycles have been accumulated, i.e., whether the correction coefficient Kg for the target regenerative braking force can be calculated. If the determination in step 270 gives the negative result, the operation returns to step 10. If the determination in step 270 gives the affirmative result, an average Gbta of the final target deceleration Gbt corresponding to the latest predetermined cycles, and an average Gbxa of the actual vehicle deceleration Gbx corresponding to the latest predetermined cycles, are calculated in step 290, and the correction coefficient Kg for the target frictional braking force is calculated in step 290 according to an equation (9) shown below.

$$Kg = Gbxa/Gbta \quad (9)$$

In the present exemplary embodiment, as shown in FIG. 8, if the processes of step 112 in the routine for calculating and correcting the target regenerative braking force is completed, the target regenerative braking force Fgft for the front wheels and the target regenerative braking force Fgrt for the rear wheels are corrected by being multiplied by Kg in step 114. Then, the processes in steps 116 to 152 are performed as in the case of the first exemplary embodiment.

Hence, according to the second exemplary embodiment, the basic control of braking forces is performed substantially in the same manner as in the case of the aforementioned first exemplary embodiment. However, if the control of braking forces is performed for the first or $N^{th}$ time, the determination in step 90 gives the affirmative result. Then, the processes in steps 220 to 290, shown in FIG. 5, are performed and braking forces are controlled in the single braking mode realized by frictional braking. At this moment, an average Gbta of the final target deceleration Gbt corresponding to predetermined cycles and an average Gbxa of the actual vehicle deceleration Gbx corresponding to predetermined cycles are calculated, and the correction coefficient Kg for the target frictional braking forces Fpft, Fprt is calculated as a ratio of Gbxa to Gbta. The target regenerative braking forces Fgft, Fgrt are corrected by being multiplied by Kg in step 110, more specifically, in step 114 of FIG. 8.

Thus, even in a situation in which an actually generated frictional braking force decreases with respect to a target frictional braking force, for example, due to a decrease in the friction coefficient of a frictional member of a frictional braking device, the target regenerative braking forces Fgft, Fgrt are multiplied by Kg, whereby the regenerative braking forces during a shift between the cooperative braking mode and the single braking mode are reduced. Thus, the braking force for the entire vehicle can be controlled so as to correspond to an amount of braking operation performed by the driver regardless of the control mode of braking forces. Even in the case where the control mode of braking forces shifts between the cooperative braking mode and the single braking mode, the braking force for the entire vehicle can be prevented from fluctuating, whereby a passenger in the vehicle can be reliably prevented from feeling a sense of incongruity.

Figure 16:
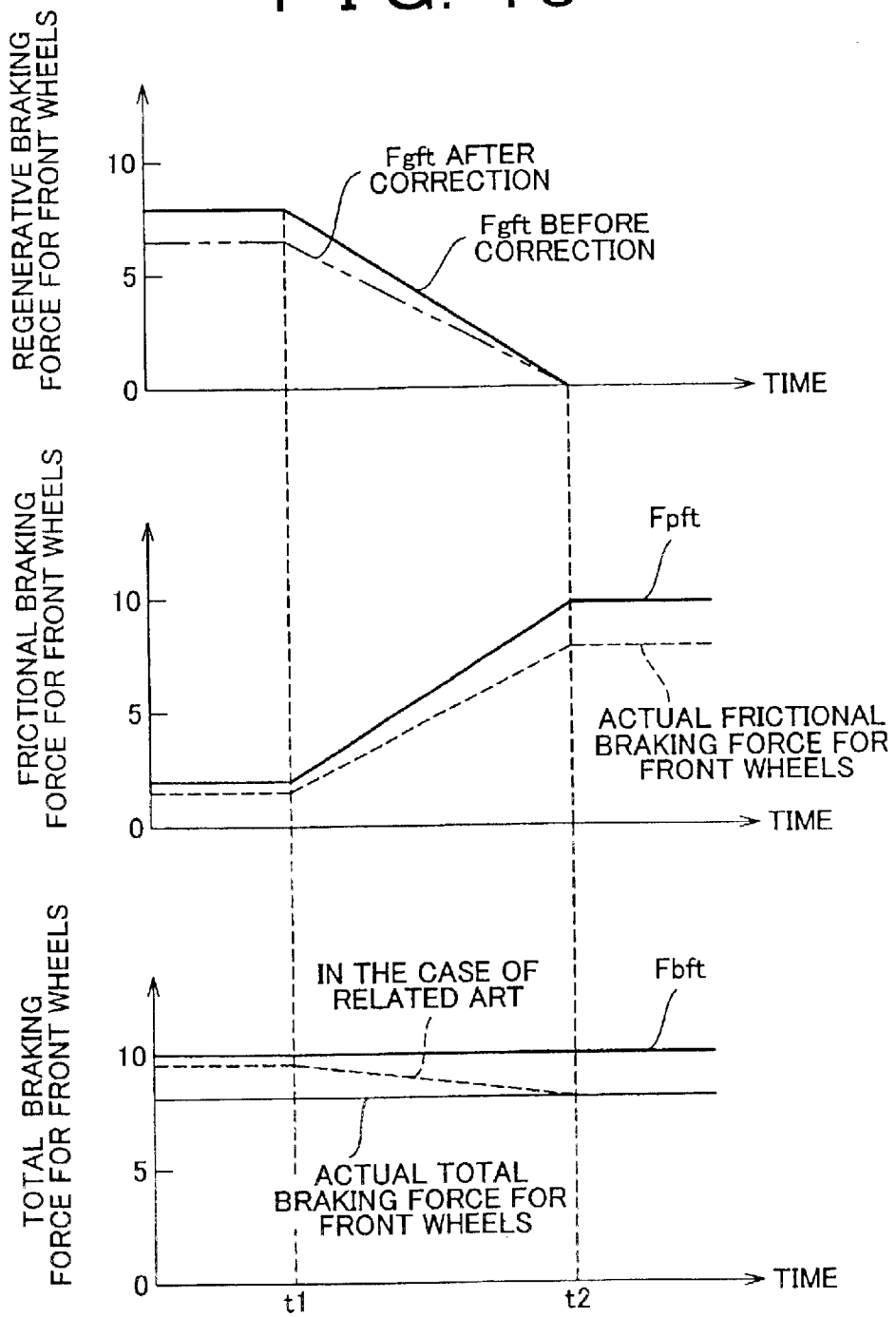
FIG. 16 is a graph showing an operation of the second exemplary embodiment in the case where the front wheels shift from a cooperative braking mode to a single braking mode, in the form of comparison with the case of the related art.

For example, FIG. 16 is a graph which is similar to FIG. 15 and which shows an operation of the second exemplary embodiment in the case where the front wheels shift from the cooperative braking mode to the single braking mode realized by frictional braking, compared to the related art.

As in the case of FIG. 15, if it is assumed that the friction coefficient $\mu a$ of the frictional members of the frictional braking devices for the front and rear wheels has dropped to 80% of its designed value pd, the correction coefficient Kg is 0.8. As indicated by an alternate long and two short dashes line in the upper stage of FIG. 16, the target regenerative braking force for the front wheels is 8×0.8=6.4 in the cooperative braking mode, and gradually decreases to 0 during a shift to the single braking mode.

Thus, if it is assumed that the actual regenerative braking force for the front wheels is equal to the target regenerative braking force for the front wheels, the actual frictional braking force for the front wheels is 6.4+1.6=8 in the cooperative braking mode and 10×0.8=8 in the single braking mode as indicated by a thin solid line in the lower stage of FIG. 16. As a result, the total braking force for the front wheels is 8 (constant) regardless of the braking mode. Therefore, the vehicle deceleration also becomes constantly equal to 80% of a reference deceleration corresponding to an amount of braking operation performed by the driver. Thus, even in the case where the braking mode shifts from the cooperative braking mode to the single braking mode, the vehicle deceleration can be reliably prevented from fluctuating.

Figure 10:
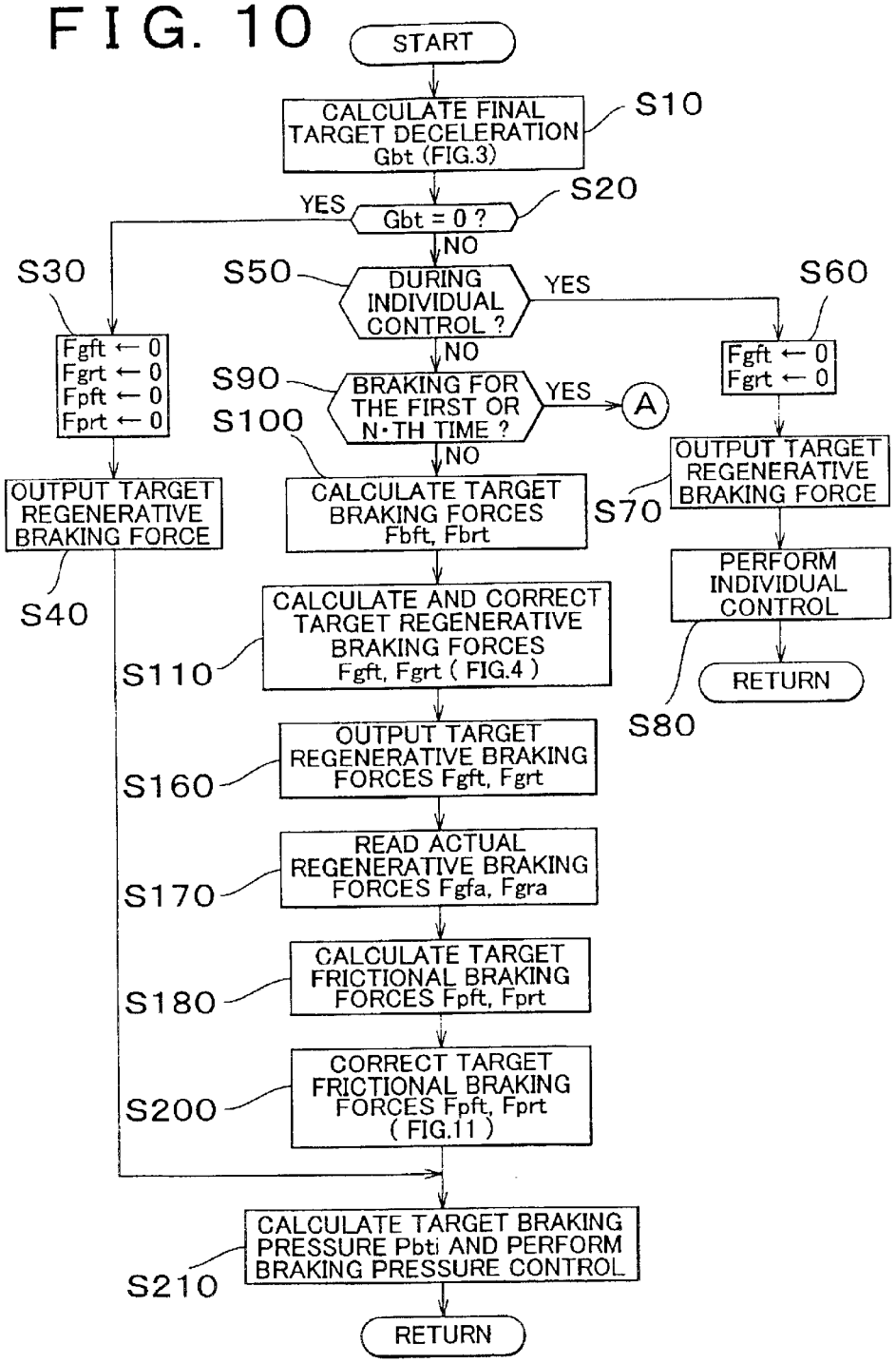
FIG. 10 is a flowchart showing a main routine of a braking force control performed by a braking control apparatus according to a third exemplary embodiment of the invention constructed as a modification example of the first exemplary embodiment.
Figure 11:
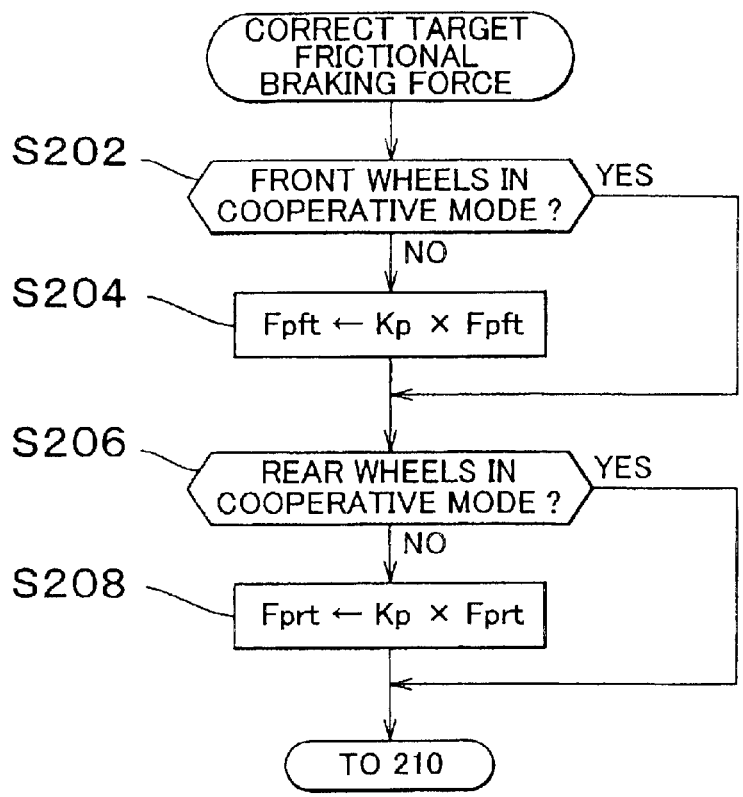
FIG. 11 is a flowchart showing a routine for correcting target frictional braking forces Fpft, Fprt in the third exemplary embodiment.

FIG. 10 is a flowchart showing a main routine of a braking force control performed by a braking control apparatus according to a third exemplary embodiment of the invention constructed as a modification example of the first exemplary embodiment. FIG. 11 is a flowchart showing a routine for correcting the target frictional braking forces Fpft, Fprt. It is to be noted in FIG. 10 that steps corresponding to those in FIG. 2 are denoted by the same numbers.

In the third exemplary embodiment, the processes in the steps are performed substantially in the same manner as in the case of the aforementioned first exemplary embodiment, except that the target frictional braking force Fpft for the front wheels or the target frictional braking force Fprt for the rear wheels is corrected according to a routine shown in FIG. 11 in step 200 which follows step 190.

As shown in FIG. 11, in step 202 of the routine for correcting the target frictional braking forces, it is determined whether the front wheels are being controlled in the cooperative braking mode, i.e., whether or not the front wheels are neither in the single braking mode nor in a shift between the modes. If the determination in step 202 gives the affirmative result, the operation immediately proceeds to step 206. If the determination in step 202 gives the negative result, the target frictional braking force Fpft for the front wheels is corrected by being multiplied by Kp in step 204.

Similarly, it is determined in step 206 whether the rear wheels are being controlled in the cooperative braking mode. If the determination in step 206 gives the affirmative result, the operation immediately proceeds to step 210. If the determination in step 206 gives the negative result, the target frictional braking force Fprt for the rear wheels is corrected by being multiplied by Kp in step 208. The operation then proceeds to step 210.

Hence, according to the third exemplary embodiment, the target frictional braking forces Fpft, Fprt are corrected by being multiplied by Kp only if the braking mode is in the single braking mode or in a shift from the cooperative braking mode to the single braking mode, whereby the total braking force during a shift of the braking mode from the cooperative braking mode to the single braking mode is prevented from abruptly changing. Thus, the vehicle deceleration can be effectively prevented from fluctuating when the braking mode shifts from the cooperative braking mode to the single braking mode.

Figure 17:
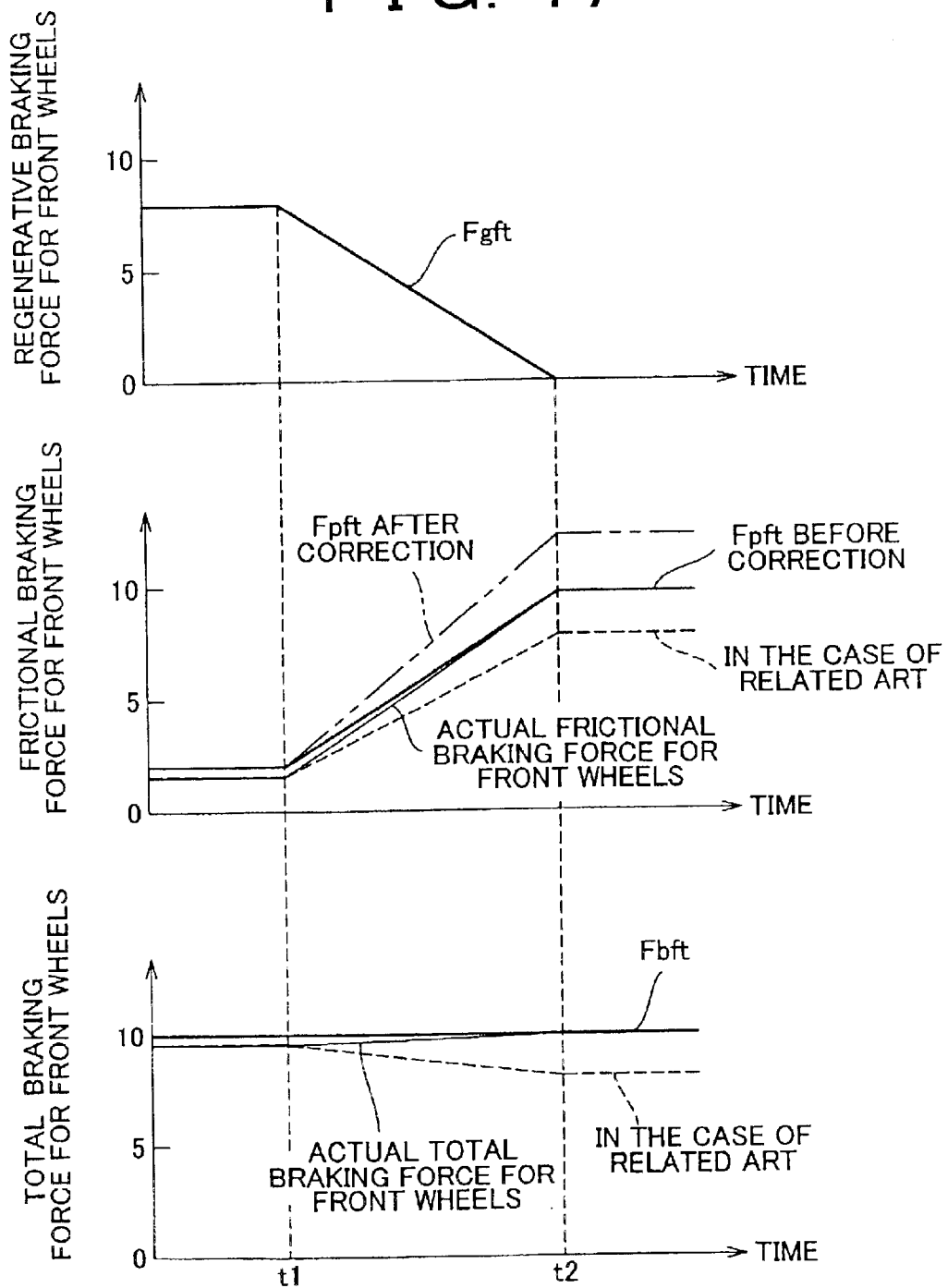
FIG. 17 is a graph showing an operation of the third exemplary embodiment in the case where the front wheels shift from a cooperative braking mode to a single braking mode, in the form of comparison with the case of the related art.

For example, FIG. 17 is a graph which is similar to FIG. 15 and which shows an operation of the third exemplary embodiment in the case where the front wheels shift from the cooperative braking mode to the single braking mode realized by frictional braking, compared to the related art.

As in FIGS. 15 and 16, if it is assumed that the friction coefficient $\mu a$ of the frictional members of the frictional braking devices for the front and rear wheels has dropped to 80% of its designed value, the correction coefficient Kp is 1.25. As indicated by an alternate long and two short dashes line in the middle stage of FIG. 17, the target frictional braking force for the front wheels is corrected by being multiplied by 1.25 after the time t1 and is equal to 10×1.25= 12.5 in the single braking mode. The target frictional braking force for the front wheels gradually increases from 2 to 12.5 during a shift from the cooperative braking mode to the single braking mode.

Thus, if it is assumed that the actual regenerative braking force for the front wheels is equal to the target regenerative braking force, the actual frictional braking force for the front wheels is 2×0.8=1.6 in the cooperative braking mode and 12.5×0.8=10 in the single braking mode, as indicated by a thin solid line in the middle stage of FIG. 17. The actual frictional braking force for the front wheels gradually increases from 1.6 to 10 during a shift from the cooperative braking mode to the single braking mode, and then reaches a value equal to a target frictional braking force, indicated by a bold solid line in the middle stage of FIG. 17. As a result, the total braking force for the front wheels only changes from 8+1.6=9.6 to 10 during a shift from the cooperative braking mode to the single braking mode. That is, the amount of change in the total braking force for the front wheels can be substantially reduced in comparison with the case of the related art in which the change occurs from 9.6 to 8. Thus, the vehicle deceleration can be effectively prevented from abruptly fluctuating when the braking mode shifts from the cooperative braking mode to the single braking mode.

In the aforementioned exemplary embodiments, when the braking control mode shifts from the single braking mode to the cooperative braking mode, the lapse of time is reversed with respect to the cases of FIGS. 15 to 17. Accordingly, the same holds true except that changes in the braking forces are reversed with respect to the cases of FIGS. 15 to 17. Thus, according to the aforementioned exemplary embodiments, the vehicle deceleration can also be reliably prevented from fluctuating even when the braking control mode shifts from the single braking mode to the cooperative braking mode.

The foregoing examples describe instances where the friction coefficient $\mu a$ of the frictional members of the frictional braking devices has become smaller than its designed value $\mu d$. However, according to the aforementioned exemplary embodiments, even when the friction coefficient $\mu a$ of the frictional members is larger than its designed value $\mu d$, the vehicle deceleration can be reliably prevented from abruptly changing when the braking control mode shifts from the single braking mode to the cooperative braking mode. It is to be noted in this case that the correction coefficient Kp is smaller than 1 and that the correction coefficient Kg is on the other hand larger than 1.

According to the exemplary embodiments, braking forces for the wheels are controlled in the single braking mode when the braking control is performed for the first or $N^{th}$ time. The correction coefficient Kp or Kg is calculated on the basis of an actual vehicle deceleration and a reference vehicle deceleration based on an amount of braking operation performed by the driver at that moment. The target frictional braking force is corrected by being multiplied by Kp, or the target regenerative braking force is corrected by being multiplied by Kg. Hence, the vehicle deceleration is prevented from abruptly changing when the braking mode of braking forces shifts between the cooperative braking mode and the single braking mode. Thus, braking forces for the vehicle can be controlled more easily and more conveniently in comparison with a case where the frictional braking force or the regenerative braking force is controlled in a feedback manner each time on the basis of a difference between an actual vehicle deceleration and a reference vehicle deceleration based on an amount of braking operation performed by the driver. Hence, the vehicle deceleration can be easily and conveniently prevented from abruptly changing when the braking mode of braking forces shifts between the cooperative braking mode and the single braking mode.

According to the exemplary embodiments, the ratio of the sum of braking forces applied by the frictional braking device and the regenerative braking device for the rear wheels, to the sum of braking forces applied by the frictional braking devices and the regenerative braking devices for the front and rear wheels is controlled so as to become equal to a predetermined braking force distribution ratio Kf/Kr between the front and rear wheels. Hence, the braking force distribution ratio between the front and rear wheels can be reliably controlled so as to become equal to the predetermined braking force distribution ratio between the front and rear wheels regardless of the ratio between braking forces applied by the frictional braking devices and braking forces applied by the regenerative braking devices. Thus, it becomes possible to reliably prevent a decrease in the stability of the vehicle or a change in steering characteristics, caused by the braking force distribution ratio between the front and rear wheels being equal to a value other than the predetermined distribution ratio.

In the exemplary embodiments, the regenerative braking force and the frictional braking force for the front wheels are controlled such that the braking force applied by the regenerative braking device for the front wheels is maximized, whereby the target braking force Fbft for the front wheels is achieved. Similarly, the regenerative braking force and the frictional braking force for the rear wheels are controlled such that the braking force applied by the regenerative braking device for the rear wheels is maximized, whereby the target braking force Fbrt for the rear wheels is achieved. Therefore, while the predetermined braking force distribution ratio between the front and rear wheels is achieved, the regenerative braking forces and the frictional braking forces can be controlled such that the regeneration efficiency in the entire vehicle is maximized.

In general, various restrictions are imposed on a regenerative braking device, especially on a regenerative braking device employing a motor-generator built into a hybrid engine. Thus, even if the regenerative braking device is controlled at a certain target regenerative braking force, the actual regenerative braking force does not become equal to the target regenerative braking force. That is, the actual regenerative braking force becomes smaller than the target regenerative braking force.

According to the exemplary embodiments, the engine control device 28 controls the motor-generator 14 of the regenerative braking device 30 for the front wheels and the motor-generator 42 of the regenerative braking device 40 for the rear wheels with the target regenerative braking force Fgft for the front wheels being defined as an upper limit and with the target regenerative braking force Fgrt for the rear wheels being defined as an upper limit. Each of the actual braking forces Fgfa, Fgra for the front and rear wheels is calculated on the basis of a voltage and a current generated by a corresponding one of the motor-generators. The target frictional braking force Fpft for the front wheels and the target frictional braking force Fprt for the rear wheels are calculated by subtracting the actual regenerative braking forces Fgfa, Fgra from the target braking forces Fbft, Fbrt respectively. Thus, in comparison with the case where the target frictional braking force Fpft for the front wheels and the target frictional braking force Fprt for the rear wheels are calculated by subtracting the target regenerative braking forces Fgft, Fgrt from the target braking forces Fbft, Fbrt respectively, the frictional braking forces for the front and rear wheels can be controlled such that the braking force for the entire vehicle more precisely corresponds to an amount of braking requirement made by the driver.

Although the apparatus and methods of the invention have been described above in detail as to the specific embodiments thereof, it would be obvious to those skilled in the art that the invention is not limited to the aforementioned exemplary embodiments and that other embodiments are possible within the scope of the invention.

For example, the degree of the reference vehicle deceleration and the degree of the actual vehicle deceleration are the reference vehicle deceleration Gbt and the actual vehicle deceleration Gbx respectively in the aforementioned embodiments. However, it is contemplated that the degree of the reference vehicle deceleration and the degree of the actual vehicle deceleration be an arbitrary value indicating a degree of vehicle deceleration such as a change amount in vehicle speed for a predetermined period.

In the aforementioned exemplary embodiments, the target frictional braking force or the target regenerative braking force is corrected by being multiplied by Kp or Kg. However, it is also contemplated that both the target frictional braking force and the target regenerative braking force be corrected based on a correction coefficient corresponding to the correction coefficients Kp and Kg.

In the aforementioned exemplary embodiments, even if the friction coefficient of the frictional members of the frictional braking devices greatly fluctuates, the driver is not warned. However, if the correction coefficient Kp is larger than a predetermined reference value or if the correction coefficient Kg is smaller than a predetermined reference value, it is also contemplated that the driver be warned under circumstances where the friction coefficient of the frictional members greatly fluctuates.

In the aforementioned exemplary embodiments, the braking force control apparatus is a hydraulically operated braking force control apparatus in which each of braking forces is increased or reduced through an increase or decrease in a corresponding one of wheel cylinder pressures. However, the braking force control apparatus according to the invention may also be designed as an electrically operated braking force control apparatus having an electric pressing device such as a motor for pressing a frictional member such as a brake pad against a rotational member such as a brake rotor disposed in each of wheels.

In the aforementioned exemplary embodiments, the target regenerative braking force and the actual regenerative braking force are transmitted between the engine control device 28 and the braking control device 52. However, it is also contemplated that the target regenerative braking torque be calculated on the basis of the target regenerative braking force, that a signal indicating the target regenerative braking torque be transmitted from the braking control device 52 to the engine control device 28, that regenerative braking be controlled by the engine control device 28 with the target regenerative braking torque being defined as an upper limit, that a signal indicating the actual regenerative braking torque be transmitted on the other hand from the engine control device 28 to the braking control device 52, and that the actual regenerative braking force be calculated on the basis of the actual regenerative braking torque.

In the aforementioned exemplary embodiments, the target vehicle deceleration Gbt is calculated on the basis of the depression stroke Sp of the brake pedal 32 and the master cylinder pressure Pm, and the target braking force Fbft for the front wheels and the target braking force Fbrt for the rear wheels are calculated on the basis of the target deceleration. However, it is also contemplated that the target braking forces for the front and rear wheels be calculated on the basis of the depression stroke Sp or the master cylinder pressure Pm.

In the aforementioned exemplary embodiments, the drive means for driving the vehicle is the hybrid engine 10 including the gasoline engine 12 and the motor-generator 14, which operates as a generator for regenerative braking. However, the internal combustion engine installed in the hybrid engine may also be an internal combustion engine of another type such as a diesel engine. Further, it is also contemplated that the drive means for driving the vehicle be an internal combustion engine of a normal type and that the generator for regenerative braking be separated from the internal combustion engine.

In the aforementioned exemplary embodiments, the vehicle is a front-drive vehicle. However, the vehicle to which the invention is applied may also be a rear-drive vehicle or a four-wheel-drive vehicle. Further, the motor-generator 40 for the rear wheels operates solely as a generator for regenerative braking. For example, however, it is also contemplated that the motor-generator 40 for the rear wheels function as an auxiliary drive source for driving the rear wheels in case of necessity.

In the exemplary embodiments, the engine control device 28 and the braking control device 52 may be implemented as a programmed general purpose computer. It will be appreciated by those skilled in the art that the engine control device and braking control device can be implemented using a single special purpose integrated circuit (e.g., ASIC) having a main or central processor section for overall, system-level control, and separate sections dedicated to performing various different specific computations, functions and other processes under control of the central processor section. The control devices also can be a plurality of separate dedicated or programmable integrated or other electronic circuits or devices (e.g., hardwired electronic or logic circuits such as discrete element circuits, or programmable logic devices such as PLDs, PLAs, PALs or the like). The control devices can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the control devices. A distributed processing architecture can be used for maximum data/signal processing capability and speed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A vehicular braking control apparatus comprising a controller that:

controls frictional braking that is performed by a frictional braking device, controls regenerative braking, that is performed by a regenerative braking device, and controls shifting between a cooperative braking mode and a single braking mode, wherein the cooperative braking mode includes the frictional braking and the regenerative braking, and the single braking mode includes only the frictional braking;

calculates a correction coefficient for one of a frictional braking control amount and a regenerative braking control amount on the basis of an actual degree of vehicle deceleration and a reference degree of vehicle deceleration based on an amount of braking operation performed by a driver during braking in the single braking mode; and corrects the control amount based on the correction coefficient, wherein the correction coefficient is a ratio of the reference degree of vehicle deceleration to the actual degree of vehicle deceleration.

2. The vehicular braking control apparatus according to claim 1, wherein the controller calculates a correction coefficient for the frictional braking control amount.

3. The vehicular braking control apparatus according to claim 1, wherein the controller corrects the frictional braking control amount based on the correction coefficient during a shift between the cooperative braking mode and the single braking mode, and when in the single braking mode.

4. The vehicular braking control apparatus according to claim 3, wherein the controller corrects the frictional braking control amount based on the correction coefficient when not in the cooperative braking mode during a braking control.

5. The vehicular braking control apparatus according to claim 1, wherein the controller calculates a correction coefficient for the regenerative braking control amount.

6. The vehicular braking control apparatus according to claim 5, wherein the correction coefficient is a ratio of the actual degree of vehicle deceleration to the reference degree of vehicle deceleration.

7. The vehicular braking control apparatus according to claim 1, wherein the reference degree of vehicle deceleration is a target vehicle deceleration based on an amount of braking operation performed by the driver, and the actual degree of vehicle deceleration is an actual vehicle deceleration.

8. The vehicular braking control apparatus according to claim 1, wherein the controller calculates the correction coefficient for performing a braking control in the single braking mode at least at the beginning of the braking control and calculates a correction coefficient for the frictional braking control amount on the basis of an actual degree of vehicle deceleration and a reference degree of vehicle deceleration based on an amount of braking operation performed by the driver during the braking control.

9. A braking control method for a vehicular braking control apparatus in which frictional braking is performed by a frictional braking device, regenerative braking is performed by a regenerative braking device, and shifting occurs between a cooperative braking mode and a single braking mode, wherein the cooperative braking mode includes the frictional braking and the regenerative braking, and the single braking mode includes only the frictional braking, comprising the steps of:

calculating a correction coefficient for one of a frictional braking control amount and a regenerative braking control amount on the basis of an actual degree of vehicle deceleration and a reference degree of vehicle deceleration based on an amount of braking operation performed by a driver during braking in the single braking mode; and correcting the control amount based on the correction coefficient, wherein the correction coefficient is a ratio of the reference degree of vehicle deceleration to the actual degree of vehicle deceleration.

10. The braking control method according to claim 9, wherein the correction coefficient is a correction coefficient for the frictional braking control amount.

11. The braking control method according to claim 9, wherein the frictional braking control amount is corrected by the correction coefficient when not in the cooperative braking mode during the braking control.

12. The braking control method according to claim 9, wherein the correction coefficient is a correction coefficient for the regenerative braking control amount.

13. The braking control method according to claim 12, wherein the correction coefficient is a ratio of the actual degree of vehicle deceleration to the reference degree of vehicle deceleration.

14. The braking control method according to claim 9, wherein the reference degree of vehicle deceleration is a target vehicle deceleration based on an amount of braking operation performed by the driver, and the actual degree of vehicle deceleration is an actual vehicle deceleration.

* * * * *